US012165257B2

(12) United States Patent
Lewis et al.

(10) Patent No.: US 12,165,257 B2
(45) Date of Patent: *Dec. 10, 2024

(54) COMPUTER VISION SYSTEMS AND METHODS FOR GENERATING BUILDING MODELS USING THREE-DIMENSIONAL SENSING AND AUGMENTED REALITY TECHNIQUES

(71) Applicant: Insurance Services Office, Inc., Jersey City, NJ (US)

(72) Inventors: Jeffery Devon Lewis, Orem, UT (US); Corey David Reed, Cedar Hills, UT (US); Logan Lawrence, Orem, UT (US); Brandon O'Very, Saratoga Springs, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,842

(22) Filed: Jun. 27, 2023

(65) Prior Publication Data

US 2023/0343030 A1    Oct. 26, 2023

Related U.S. Application Data

(63) Continuation of application No. 17/705,130, filed on Mar. 25, 2022, now Pat. No. 11,688,135.

(Continued)

(51) Int. Cl.
*G06T 19/00*   (2011.01)
*G06T 17/05*   (2011.01)
(Continued)

(52) U.S. Cl.
CPC ............ *G06T 17/05* (2013.01); *G06T 19/006* (2013.01); *G06V 10/147* (2022.01); *G06V 20/64* (2022.01)

(58) Field of Classification Search
None
See application file for complete search history.

(56) References Cited

U.S. PATENT DOCUMENTS 5,701,403 A    12/1997   Watanabe et al.
6,446,030 B1    9/2002   Hoffman et al.
(Continued)

FOREIGN PATENT DOCUMENTS

WO    2014/151122 A1    9/2014
WO    2016/154306 A1    9/2016
WO    2017/100658 A1    6/2017

OTHER PUBLICATIONS

Notice of Allowance dated Jul. 3, 2024, issued in connection with U.S. Appl. No. 17/895,500 (6 pages).

(Continued)

*Primary Examiner* — Nicholas R Wilson
(74) *Attorney, Agent, or Firm* — McCarter & English, LLP

(57) ABSTRACT

Computer vision systems and methods for generating building models using three-dimensional sensing and augmented reality (AR) techniques are provided. Image frames including images of a structure to be modeled are captured by a camera of a mobile device such as a smart phone, as well as three-dimensional data corresponding to the image frames. An object of interest, such as a structural feature of the building, is detected using both the image frames and the three-dimensional data. An AR icon is determined based upon the type of object detected, and is displayed on the mobile device superimposed on the image frames. The user can manipulate the AR icon to better fit or match the object of interest in the image frames, and can capture the object of interest using a capture icon displayed on the display of the mobile device.

24 Claims, 19 Drawing Sheets

Related U.S. Application Data

(60) Provisional application No. 63/165,972, filed on Mar. 25, 2021.

(51) Int. Cl.
 *G06V 10/147* (2022.01)
 *G06V 20/64* (2022.01)

(56) References Cited

U.S. PATENT DOCUMENTS

| | | |
|---|---|---|
| 6,448,964 B1 | 9/2002 | Isaacs et al. |
| 8,533,063 B2 | 9/2013 | Erickson |
| 8,843,304 B1 | 9/2014 | Dupont et al. |
| 8,868,375 B1 | 10/2014 | Christian |
| 8,983,806 B2 | 3/2015 | Labrie et al. |
| 9,158,869 B2 | 10/2015 | Labrie et al. |
| 9,430,871 B2 | 8/2016 | Neophytou et al. |
| 9,501,700 B2 | 11/2016 | Loveland et al. |
| 9,679,227 B2 | 6/2017 | Taylor et al. |
| 10,127,670 B2 | 11/2018 | Lewis et al. |
| 10,181,079 B2 | 1/2019 | Labrie et al. |
| 10,289,760 B1 | 5/2019 | Oakes, III et al. |
| 10,387,582 B2 | 8/2019 | Lewis et al. |
| 10,445,438 B1 | 10/2019 | Motonaga et al. |
| 10,529,028 B1 | 1/2020 | Davis et al. |
| 11,314,905 B2 | 4/2022 | Childs et al. |
| 11,688,135 B2 | 6/2023 | Lewis et al. |
| 11,688,186 B2 | 6/2023 | Harris et al. |
| 11,734,468 B2 | 8/2023 | Lewis et al. |
| 2002/0116254 A1 | 8/2002 | Stein et al. |
| 2003/0009315 A1 | 1/2003 | Thomas et al. |
| 2007/0080961 A1 | 4/2007 | Inzinga et al. |
| 2007/0276626 A1 | 11/2007 | Bruffey |
| 2009/0179895 A1 | 7/2009 | Zhu et al. |
| 2010/0110074 A1 | 5/2010 | Pershing |
| 2010/0114537 A1 | 5/2010 | Pershing |
| 2010/0296693 A1 | 11/2010 | Thornberry et al. |
| 2011/0056286 A1 | 3/2011 | Jansen |
| 2011/0157213 A1 | 6/2011 | Takeyama et al. |
| 2011/0191738 A1 | 8/2011 | Walker et al. |
| 2012/0026322 A1 | 2/2012 | Malka et al. |
| 2012/0179431 A1 | 7/2012 | Labrie et al. |
| 2012/0253725 A1 | 10/2012 | Malka et al. |
| 2012/0253751 A1 | 10/2012 | Malka et al. |
| 2013/0201167 A1 | 8/2013 | Oh et al. |
| 2013/0206177 A1 | 8/2013 | Burlutskiy |
| 2013/0226451 A1 | 8/2013 | O'Neill et al. |
| 2013/0262029 A1 | 10/2013 | Pershing |
| 2013/0267260 A1 | 10/2013 | Chao et al. |
| 2013/0314688 A1 | 11/2013 | Likholyot |
| 2014/0043436 A1 | 2/2014 | Bell et al. |
| 2014/0195275 A1 | 7/2014 | Pershing et al. |
| 2014/0301633 A1 | 10/2014 | Furukawa et al. |
| 2014/0320661 A1 | 10/2014 | Sankar et al. |
| 2015/0029182 A1 | 1/2015 | Sun et al. |
| 2015/0073864 A1 | 3/2015 | Labrie et al. |
| 2015/0093047 A1 | 4/2015 | Battcher et al. |
| 2015/0116509 A1 | 4/2015 | Birkler et al. |
| 2015/0153172 A1 | 6/2015 | Starns et al. |
| 2015/0193971 A1 | 7/2015 | Dryanovski et al. |
| 2015/0213558 A1 | 7/2015 | Nelson |
| 2015/0227645 A1 | 8/2015 | Childs et al. |
| 2015/0269438 A1 | 9/2015 | Samarasekera et al. |
| 2015/0302529 A1 | 10/2015 | Jagannathan |
| 2016/0098802 A1 | 4/2016 | Bruffey et al. |
| 2016/0110480 A1 | 4/2016 | Randolph |
| 2016/0246767 A1 | 8/2016 | Makadia et al. |
| 2016/0282107 A1 | 9/2016 | Roland et al. |
| 2017/0124713 A1 | 5/2017 | Jurgenson et al. |
| 2017/0132711 A1 | 5/2017 | Bruffey et al. |
| 2017/0132835 A1 | 5/2017 | Halliday et al. |
| 2017/0169459 A1 | 6/2017 | Bruffey et al. |
| 2017/0193297 A1 | 7/2017 | Michini et al. |
| 2017/0206648 A1 | 7/2017 | Marra et al. |
| 2017/0221152 A1 | 8/2017 | Nelson et al. |
| 2017/0316115 A1 | 11/2017 | Lewis et al. |
| 2017/0330207 A1 | 11/2017 | Labrie et al. |
| 2017/0345069 A1 | 11/2017 | Labrie et al. |
| 2018/0053329 A1 | 2/2018 | Roberts et al. |
| 2018/0067593 A1 | 3/2018 | Tiwari et al. |
| 2018/0089833 A1 | 3/2018 | Lewis et al. |
| 2018/0286098 A1 | 10/2018 | Lorenzo |
| 2018/0330528 A1 | 11/2018 | Loveland et al. |
| 2018/0357819 A1 | 12/2018 | Oprea |
| 2018/0373931 A1 | 12/2018 | Li |
| 2019/0114717 A1 | 4/2019 | Labrie et al. |
| 2019/0147247 A1 | 5/2019 | Harris et al. |
| 2019/0221040 A1 | 7/2019 | Shantharam et al. |
| 2019/0340692 A1 | 11/2019 | Labrie et al. |
| 2019/0347859 A1 | 11/2019 | Jovanovic et al. |
| 2019/0377837 A1 | 12/2019 | Lewis et al. |
| 2020/0100066 A1 | 3/2020 | Lewis et al. |
| 2020/0143481 A1 | 5/2020 | Brown et al. |
| 2021/0076162 A1 | 3/2021 | Wang et al. |
| 2021/0103687 A1 | 4/2021 | Harris et al. |
| 2021/0350038 A1 | 11/2021 | Jenson et al. |
| 2022/0309204 A1 | 9/2022 | Childs et al. |
| 2022/0309748 A1 | 9/2022 | Lewis et al. |
| 2022/0414980 A1 | 12/2022 | Lewis et al. |
| 2023/0409769 A1 | 12/2023 | Lewis et al. |

OTHER PUBLICATIONS

Notice of Allowance dated Jul. 12, 2024, issued in connection with U.S. Appl. No. 17/729,613 (9 pages).

Office Action mailed Oct. 13, 2022, issued in connection with U.S. Appl. No. 16/545,607 (53 pages).

International Search Report of the International Searching Authority mailed on Nov. 18, 2022, issued in connection with International Application No. PCT/US22/030691 (6 pages).

Written Opinion of the International Searching Authority mailed on Nov. 18, 2022, issued in connection with International Application No. PCT/US22/030691 (11 pages).

Notice of Allowance mailed Dec. 9, 2022, issued in connection with U.S. Appl. No. 17/705,130 (10 pages).

Examination Report No. 1 mailed Dec. 15, 2022, issued by the Australian Patent Office in connection with Australian Patent Application No. 2021282413 (3 pages).

Communication Pursuant to Article 94(3) EPC mailed Jan. 31, 2023, issued in connection with European Patent Application No. 16873975.3 (8 pages).

Notice of Allowance mailed Feb. 14, 2023, issued in connection with U.S. Appl. No. 17/705,130 (5 pages).

Notice of Allowance mailed Mar. 22, 2023, issued in connection with U.S. Appl. No. 16/545,607 (9 pages).

Communication Pursuant to Article 94(3) EPC issued by the European Patent Office mailed on Apr. 28, 2023, issued in connection with European Patent Application No. 19866788.3 (5 pages).

Office Action mailed Jun. 30, 2023, issued in connection with U.S. Appl. No. 17/729,613 (49 pages).

Examination Report No. 1 mailed Apr. 12, 2023, issued by the Australian Patent Office in connection with Australian Patent Application No. 2018364813 (3 pages).

Office Action mailed Dec. 7, 2023, issued by the Canadian Patent Office in connection with Canadian Patent Application No. 3,082,516 (6 pages).

International Search Report of the International Searching Authority mailed on Dec. 15, 2023, issued in connection with International Application No. PCT/US2023/031123 (6 pages).

Written Opinion of the International Searching Authority mailed on Dec. 15, 2023, issued in connection with International Application No. PCT/US2023/031123 (7 pages).

Office Action dated Jan. 30, 2024, issued in connection with U.S. Appl. No. 17/895,500 (16 pages).

Office Action dated Mar. 12, 2024, issued in connection with U.S. Appl. No. 17/122,080 (10 pages).

Sampaio, et al., "Maintenance of Building Components Supported in Interactive Environments," 10th Iberian Conference on Information Systems and Technologies, Jun. 17, 2015 (7 pages).

(56) References Cited

OTHER PUBLICATIONS

Office Action dated Mar. 14, 2024, issued in connection with U.S. Appl. No. 18/236,728 (58 pages).
Notice of Allowance dated Mar. 18, 2024, issued in connection with U.S. Appl. No. 17/729,613 (10 pages).
International Search Report of the International Searching Authority mailed on Mar. 27, 2017, issued in connection with International Application No. PCT/US2016/65947 (3 pages).
Written Opinion of the International Searching Authority mailed on Mar. 27, 2017, issued in connection with International Application No. PCT/US2016/65947 (7 pages).
Office Action mailed Sep. 26, 2018, issued in connection with U.S. Appl. No. 15/374,695 (33 pages).
Notice of Allowance mailed May 13, 2019, issued in connection with U.S. Appl. No. 15/374,695 (7 pages).
Extended European Search Report mailed Jun. 11, 2019, issued in connection with European Patent Application No. 16873975.3 (8 pages).
Communication Pursuant to Article 94(3) EPC issued by the European Patent Office mailed on Apr. 22, 2020, issued in connection with European Patent Application No. 16873975.3 (6 pages).
International Search Report of the International Searching Authority mailed on Dec. 12, 2019, issued in connection with International Application No. PCT/US2019/52670 (3 pages).
Written Opinion of the International Searching Authority mailed on Dec. 12, 2019, issued in connection with International Application No. PCT/US2019/52670 (5 pages).
Office Action mailed Feb. 5, 2020, issued in connection with U.S. Appl. No. 16/580,741 (15 pages).
International Search Report of the International Searching Authority mailed on May 14, 2015, issued in connection with International Application No. PCT/US15/015491(3 pages).
Written Opinion of the International Searching Authority mailed on May 14, 2015, issued in connection with International Application No. PCT/US15/015491 (9 pages).
Fung, et al., "A Mobile Assisted Localization Scheme for Augmented Reality," Department of Computer Science and Engineering, The Chinese University of Hong Kong, 2012 (76 pages).
Sankar, et al., "Capturing Indoor Scenes With Smartphones," UIST'12, Oct. 7-10, 2012, Cambridge, Massachusetts (9 pages).
Office Action mailed Aug. 8, 2017, issued in connection with U.S. Appl. No. 14/620,004 (26 pages).
Office Action mailed Aug. 28, 2018, issued in connection with U.S. Appl. No. 14/620,004 (33 pages).
Farin, et al., "Floor-Plan Reconstruction from Panoramic Images," Sep. 23-28, 2007, MM '07, ACM (4 pages).
Office Action mailed Mar. 29, 2019, issued in connection with U.S. Appl. No. 14/620,004 (22 pages).
Office Action mailed Dec. 10, 2019, issued in connection with U.S. Appl. No. 14/620,004 (27 pages).
Zhang, et al., "Wallk&Sketch: Create Floor Plans with an RGB-D Camera," Sep. 5-8, 2012, UbiComp '12, ACM (10 pages).
Office Action mailed Jul. 8, 2020, issued in connection with U.S. Appl. No. 14/620,004 (27 pages).
Office Action mailed Sep. 22, 2020, issued in connection with U.S. Appl. No. 16/580,741 (14 pages).
Office Action mailed Feb. 2, 2021, issued in connection with U.S. Appl. No. 14/620,004 (28 pages).
Communication Pursuant to Article 94(3) EPC issued by the European Patent Office mailed on Feb. 18, 2021, issued in connection with European Patent Application No. 16873975.3 (5 pages).
Examination Report No. 1 mailed Mar. 30, 2021, issued by the Australian Patent Office in connection with Australian Patent Application No. 2016366537 (6 pages).
Office Action mailed Apr. 21, 2021, issued in connection with U.S. Appl. No. 16/580,741 (15 pages).
Notice of Allowance mailed Aug. 19, 2021, issued in connection with U.S. Appl. No. 14/620,004 (11 pages).
Examiner-Initiated Interview Summary dated Aug. 10, 2021, issued in connection with U.S. Appl. No. 14/620,004 (1 page).
International Search Report of the International Searching Authority mailed on Feb. 11, 2019, issued in connection with International Application No. PCT/US18/60762 (3 pages).
Written Opinion of the International Searching Authority mailed on Feb. 11, 2019, issued in connection with International Application No. PCT/US18/60762 (7 pages).
Office Action mailed Apr. 16, 2020, issued in connection with U.S. Appl. No. 16/189,512 (10 pages).
U.S. Appl. No. 62/512,989, filed May 31, 2017 entiitled, "Systems and Methods for Rapidly Developing Annotated Computer Models of Structures" (47 pages).
Office Action mailed Dec. 14, 2020, issued in connection with U.S. Appl. No. 16/189,512 (10 pages).
Extended European Search Report dated Jul. 1, 2021, issued by the European Patent Office in connection with European Application No. 18876121.7 (8 pages).
Office Action mailed Jul. 20, 2021, issued in connection with U.S. Appl. No. 16/189,512 (11 pages).
Office Action mailed Dec. 27, 2021, issued in connection with U.S. Appl. No. 16/580,741 (13 pages).
Notice of Allowance mailed Dec. 16, 2021, issued in connection with U.S. Appl. No. 14/620,004 (12 pages).
Invitation to Pay Additional Fees issued by the International Searching Authority mailed on Feb. 2, 2022, issued in connection with International Application No. PCT/US21/63469 (2 pages).
Extended European Search Report dated Feb. 18, 2022, issued in connection with European Patent Application No. 19866788.3 (9 pages).
Office Action dated Feb. 3, 2022, issued by the Canadian Intellectual Property Office in connection with Canadian Application No. 3,007,968 (5 pages).
Office Action dated Mar. 25, 2022, issued in connection with U.S. Appl. No. 16/545,607 (56 pages).
International Search Report of the International Searching Authority mailed on Apr. 8, 2022, issued in connection with International Application No. PCT/US21/63469 (5 pages).
Written Opinion of the International Searching Authority mailed on Apr. 8, 2022, issued in connection with International Application No. PCT/US21/63469 (6 pages).
Notice of Allowance mailed Apr. 8, 2022, issued in connection with U.S. Appl. No. 16/189,512 (8 pages).
Notice of Allowance mailed Jun. 21, 2022, issued in connection with U.S. Appl. No. 16/189,512 (7 pages).
Dino, et al., "Image-Based Construction of Building Energy Models Using Computer Vision," Automation in Construction (2020) (15 pages).
Fathi, et al., "Automated as-Built 3D Reconstruction of Civil Infrastructure Using Computer Vision: Achievements, Opportunities, and Challenges," Advanced Engineering Informatics (2015) (13 pages).
International Search Report of the International Searching Authority mailed on Jul. 25, 2022, issued in connection with International Application No. PCT/US22/22024 (3 pages).
Written Opinion of the International Searching Authority mailed on Jul. 25, 2022, issued in connection with International Application No. PCT/US22/22024 (5 pages).
Office Action dated Sep. 2, 2022, issued in connection with U.S. Appl. No. 16/580,741 (13 pages).
Notice of Allowance mailed Sep. 6, 2022, issued in connection with U.S. Appl. No. 16/189,512 (7 pages).
Communication Pursuant to Article 94(3) EPC mailed Jan. 23, 2024, issued by the European Patent Office in connection with European Patent Application No. 19866788.3 (5 pages).
Office Action dated Jun. 4, 2024, issued by the Canadian Intellectual Property Office in connection with Canadian Application No. 3,082,516 (4 pages).

COMPUTER VISION SYSTEMS AND METHODS FOR GENERATING BUILDING MODELS USING THREE-DIMENSIONAL SENSING AND AUGMENTED REALITY TECHNIQUES

RELATED APPLICATIONS

This application is a continuation application of U.S. patent application Ser. No. 17/705,130 filed on Mar. 25, 2022, now U.S. Pat. No. 11,688,135 issued on Jun. 27, 2023, which claims the priority of U.S. Provisional Application Ser. No. 63/165,972 filed on Mar. 25, 2021, the entire disclosures of which are expressly incorporated herein by reference.

BACKGROUND

Field of the Invention

The present disclosure relates to computer vision technology. More specifically, the present disclosure relates to computer vision systems and methods for generating building models using three-dimensional sensing and augmented reality techniques.

Related Art

In the insurance underwriting, building construction, solar, and real estate industries, computer-based systems for generating models of physical structures such as residential homes, commercial buildings, etc., is becoming increasingly important. In particular, in order to generate an accurate model of a physical structure, one must have an accurate set of data which adequately describes that structure. Moreover, it is becoming increasingly important to provide computer-based systems which have adequate capabilities to generate floor plans and layouts of both the interior and exterior features of buildings, as well as to identify specific features of such buildings (e.g., doors, windows, closets, etc.).

With the advent of mobile data capturing devices including phones, tablets and ground based vehicles, it is now possible to generate models of structures using such devices. Moreover, the types and quality of sensors available in mobile devices continues to improve as time progresses. For example, today's mobile devices (e.g., smart phones) now come equipped with a wide array of sensors, such as cameras, gyroscopes, accelerometers, infrared sensors, and three-dimensional sensors such as light detection and ranging (LiDAR) sensors. Even further, due to the increased computing power of today's mobile devices, additional technologies such as augmented reality (AR) are being integrated into such devices.

What would be desirable are computer vision systems and methods which allow for the rapid generation of building models of structures, including interior and exterior models of such structures, which harness the very powerful three-dimensional sensing and AR capabilities of today's mobile devices. Accordingly, the computer vision systems and methods of the present disclosure solve these, and other, needs.

SUMMARY

The present disclosure relates to computer vision systems and methods for generating building models using three-dimensional sensing and augmented reality (AR) techniques. Image frames including images of a structure to be modeled (e.g., the interior or exterior of a building) are captured by a camera of a mobile device such as a smart phone, as well as three-dimensional data corresponding to the image frames. The three-dimensional data could be captured using a three-dimensional sensor of the mobile device, or computed from the image frames. An object of interest, such as a structural feature of the building (e.g., wall, ceiling, floor, door, window, exterior surface, roof surface, etc.), is detected using both the image frames and the three-dimensional data. An AR icon is determined based upon the type of object detected, and is displayed on the mobile device superimposed on the image frames. The user can manipulate the AR icon to better fit or match the object of interest in the image frames. If the AR icon matches the object of interest (to the user's satisfaction), the user can capture the object of interest using a capture icon displayed on the display of the mobile device. Successive objects of interest can be captured in the manner described above until all objects of interest have captured, whereupon a complete model of the structure (e.g., a model of the interior or exterior of the structure) can be created.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to computer vision systems and methods for generating building models using three-dimensional sensing and augmented reality (AR) techniques, as described in detail below in connection with FIGS. 1-8I.

Figure 1:
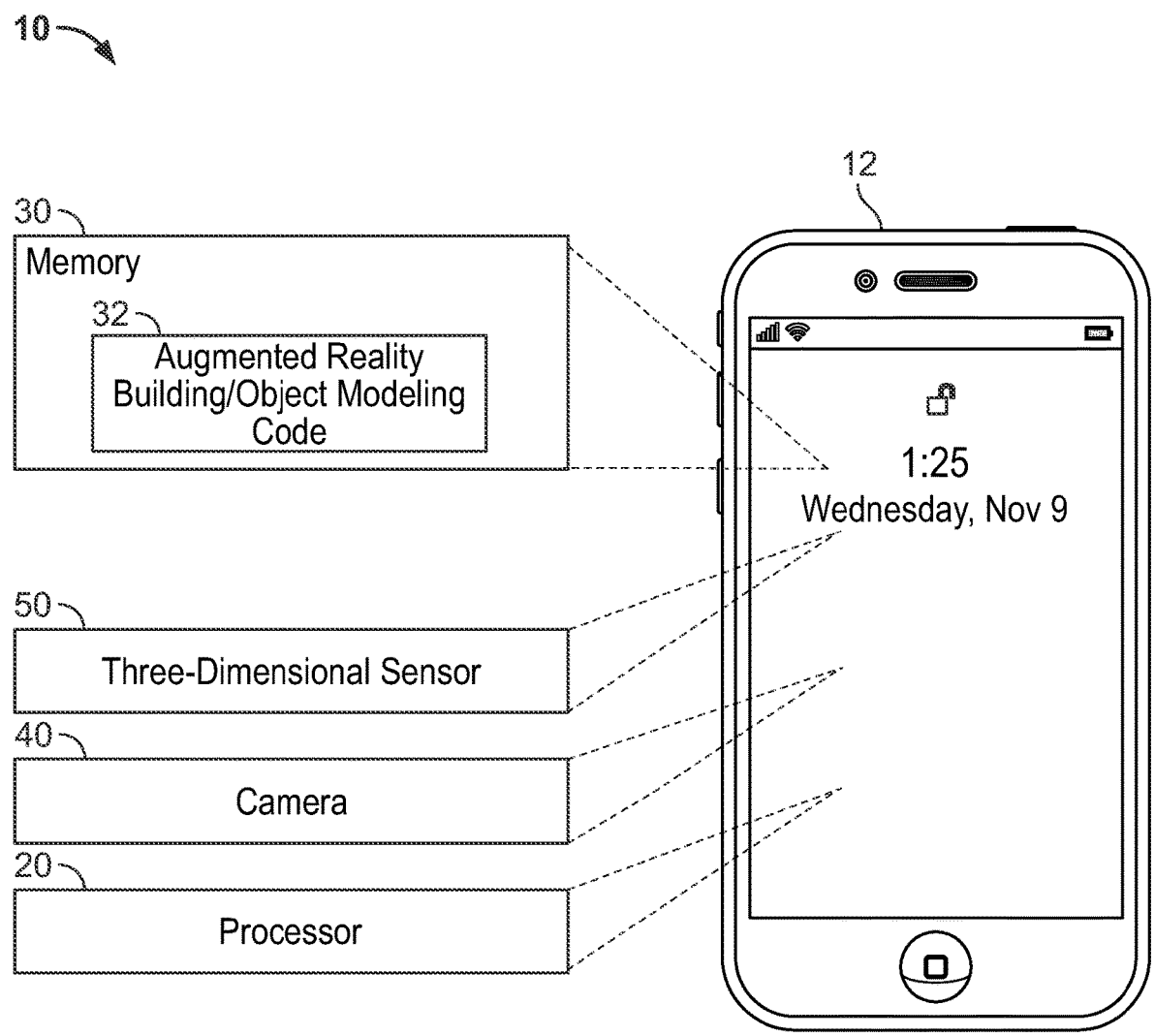
FIG. 1 is a diagram illustrating hardware and software components of the systems and methods of the present disclosure.

FIG. 1 is a diagram illustrating hardware and software components of the systems and methods of the present disclosure, indicated generally at 10. The system 10 includes a mobile device 12, which could be a smart cellular phone, a tablet computer, a laptop computer, a portable computer, or any other mobile computer system capable of being transported and used to inside of, or exterior to, a building. The mobile device 12 includes a processor 20 and a non-transitory, computer-readable memory 30 (e.g., one or more of volatile memory (e.g., random access memory (RAM)) and/or non-volatile memory (e.g., flash memory, electrically-erasable, programmable, read-only memory (EEPROM)), a memory chip, a memory card, etc.) on which is stored augmented reality building and/or object modeling software code 32. The code 32 includes computer-readable instructions which, when executed by the processor 20, cause the processor to perform the steps disclosed herein for modeling a structure and/or one or more objects in the structure using three-dimensional sensing and AR techniques.

The mobile device 12 also includes a camera 40 for capturing live video (in particular, a plurality of image frames which, together, constitute a video) and a three-dimensional sensor 50 for sensing three-dimensional data corresponding to an interior and/or exterior feature of a building or an object to be modeled. The sensor 50 could be, for example, a light detection and ranging (LiDAR) sensor or other type of three-dimensional sensor which is capable of generating three-dimensional data, such as a point cloud, corresponding to an interior and/or exterior feature of a structure or object to be imaged.

Figure 2:
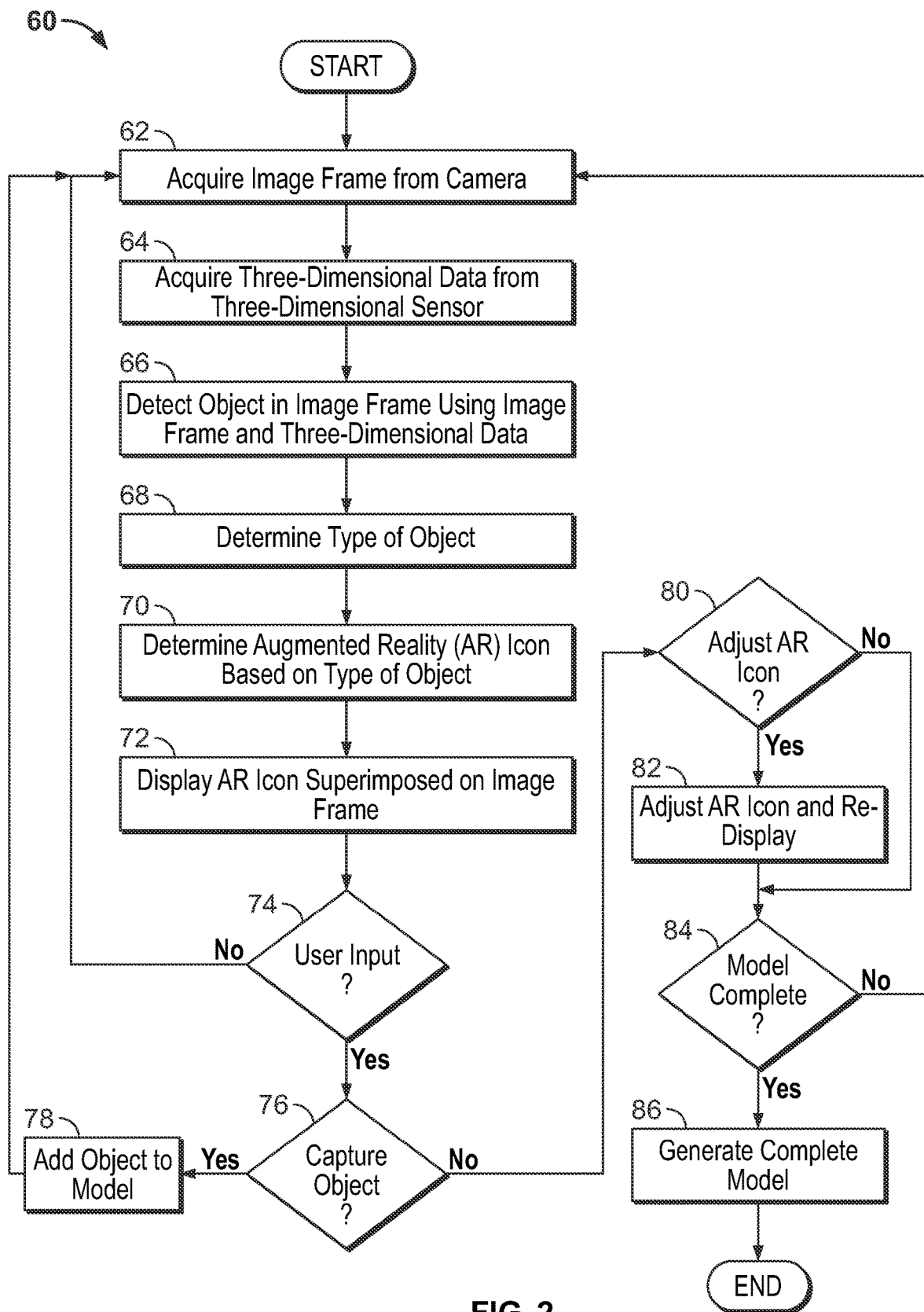
FIG. 2 is a flowchart illustrating processing steps carried out by the systems and methods of the present disclosure.

FIG. 2 is a flowchart illustrating processing steps carried out by the systems and methods of the present disclosure, indicated generally at 60. The steps 60 are embodied as the code 32 stored on the memory 30 of FIG. 1, and are executed by the processor 20 of the mobile device 12. Beginning in step 62, the device 12 acquires an image frame from the camera 40. The image frame could be a single image frame (e.g., the camera only takes a single image frame), or it could be one of a series of image frames being taken by the camera (e.g., an image frame from a real-time video taken by the camera 40). As will be discussed in greater detail in connection with FIGS. 3A-8I, the device 12 is pointed at an interior or exterior feature of a structure or object to be modeled, and such that the camera 40 is pointed to the feature and the feature appears in the image frame captured by the camera 40. In step 64, the camera acquires three-dimensional data corresponding to the feature using the three-dimensional sensor 30 of the device 12. For example, if the three-dimensional sensor 30 is a LiDAR sensor, the three-dimensional data could be a three-dimensional point cloud that includes three-dimensional data (points in a 3D coordinate system) corresponding to the feature displayed in the image frame captured by the camera 40. Thus, the feature is captured in steps 62 and 64 using both two-dimensional data (e.g., a 2D image frame) and three-dimensional data (e.g., a 3D point cloud).

In step 66, the processor 20 processes the image frame and the three-dimensional data to detect an object in the image frame, using the image frame and the three-dimensional data. As will be discussed in greater detail below in connection with FIGS. 3A-8I, the detected object could include, but is not limited to, an interior wall, ceiling, floor, door, or window, as well as an exterior feature such as a wall, door, window, or roof feature. Of course, the system 10 could be utilized to detect other objects, such as cabinets, furniture, fixtures, items within a building, and/or exterior features such as patios, driveways, sidewalks, landscaping features, etc. Step 66 could be performed using any suitable computer vision algorithm capable of detecting features from 2D and 3D data, such as a convolutional neural network (CNN) or other type of machine learning and/or artificial intelligence algorithm capable of being trained to detect desired features in 2D and 3D data.

In step 68, the processor 20 determines the type of object detected. This could be accomplished using the algorithm discussed in step 66 above, with one or more classification functions being performed. For example, in the case of a CNN, the CNN could output a binary classifier indicating whether the object detected is, or is not, a door. Multiple such classifications could be performed such that the algorithm can classify various detected objects such as walls, ceilings, floors, doors, windows, exterior features, roof features, landscaping features, etc. In step 70, the processor 20 determines an augmented reality (AR) icon based on the type of object determined in step 68. For example, if step 68 determines that the detected object is a wall, in step 70, the processor 20 determines a suitable AR icon (e.g., a displayable user interface (UI) element that can be manipulated by the user, such as a UI widget or tool) corresponding to the wall. Of course, other AR icons can be identified in step 70 corresponding to other types of objects detected in step 68 (e.g., a door AR icon if a door is detected, a ceiling AR icon if a ceiling is detected, a floor AR icon if a floor is detected, a window AR icon if a window is detected, etc.).

In step 72, the processor 20 causes a display of the device 12 to display the image frame as well as the AR icon superimposed on the image frame. For example, if the image frame includes a wall, the image frame (including the wall) is displayed on the display of the device 12, with a wall AR icon superimposed on the wall in the image frame. The AR icon could be superimposed on a portion of the detected object displayed in the image frame, and/or it could be superimposed such that it appears over the entire object displayed in the image frame.

In step 74, the processor 20 detects user input (e.g., the user taking an action in a user interface displayed on the device 12, such as tapping and/or manipulating an icon) and determines whether user input has occurred. If a negative determination is made, control returns back to step 62 so that the foregoing processing steps can be repeated (e.g., in real time, such that a real-time image frame is displayed along with a suitable AR icon which could move in the display so that it tracks movement of the object in the image when the mobile device 12 is moved). If a positive determination is made, step 76 occurs, wherein the processor 20 determines whether the user input indicates that the user desires to capture the object. In such circumstances, the user had judged that the AR icon that is displayed superimposed on the object sufficiently represents the object, and that a model representation of the object should be created and added to a three-dimensional model. If so, step 78 occurs, wherein a model representation of the object is created by the processor 20 (e.g., a 3D plane corresponding to a detected wall is created) and added to a three-dimensional model created by the processor 20 and stored in the memory 30. Otherwise, step 76 occurs.

In step 80, a determination is made as to whether the user input indicates that the user wishes to adjust the displayed AR icon. For example, the user may wish to adjust the displayed AR icon so that it better corresponds to the object over which it is displayed on the screen, in order to ensure accurate modeling of the object. If a positive determination occurs, step 82 occurs, wherein the AR icon is adjusted based on user input (e.g., by the user repositioning the icon, changing its shape, etc.) and the adjusted AR icon is re-displayed superimposed over the object. Otherwise, step 84 occurs, wherein a determination is made as to whether the current model of the feature of interest (e.g., a model of a room interior, a building exterior, etc.) is complete. If a negative determination is made, control returns to step 62 so that additional objects can be detected and modeled in the manner described above. Otherwise, if a positive determination is made, step 86 occurs, wherein the processor 20 generates a complete model of the feature of interest, and processing ends. The complete model could be saved in the memory 30 of the device 12, and/or transmitted to another computer system and/or program for further processing thereby (e.g., to generate an estimate of the cost of materials corresponding to the modeled feature of interest, generate a report detailing the modeled feature of interest, etc.).

Figure 3A:
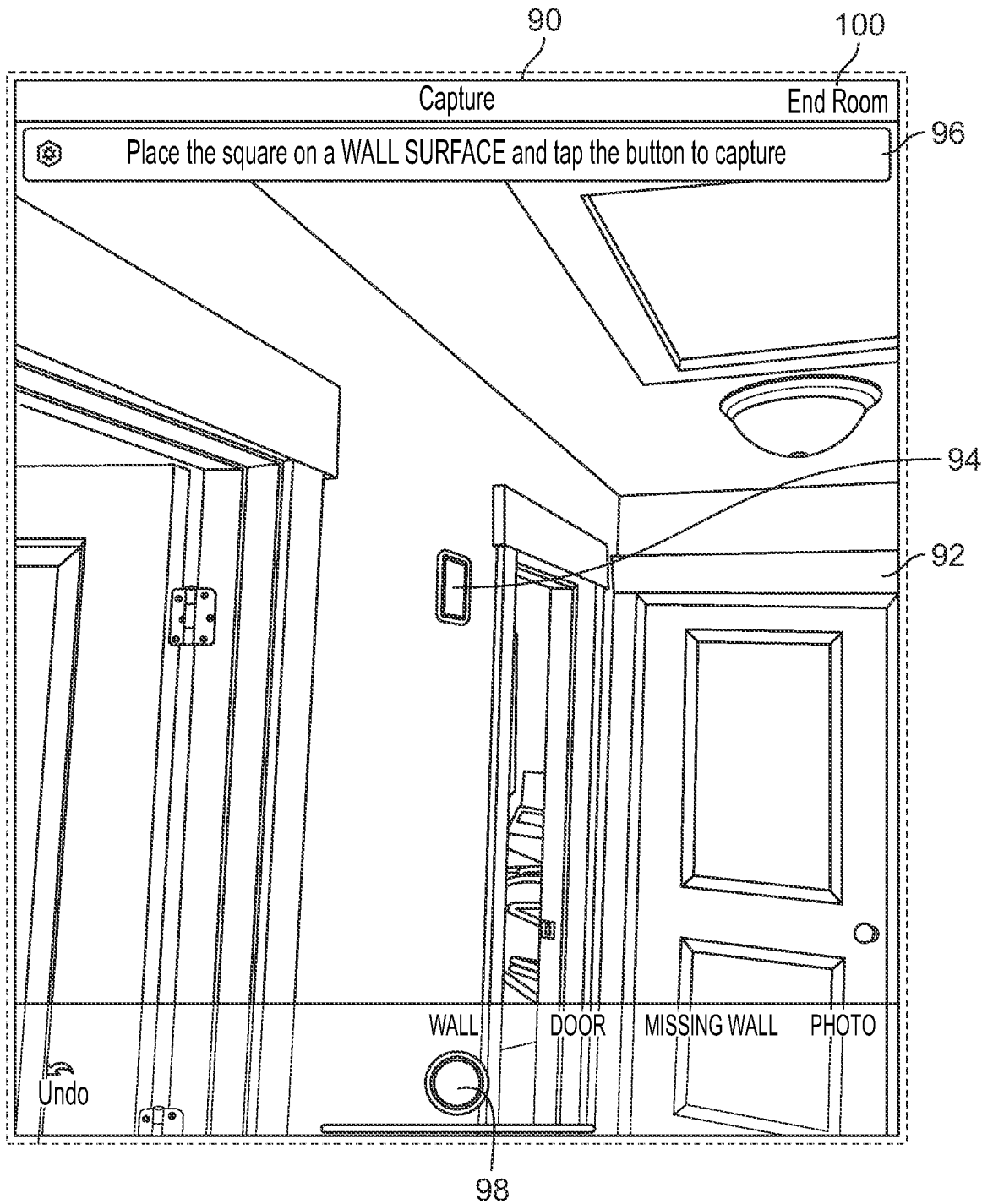
FIGS. 3A-3B are screenshots illustrating wall capture functions and associated wall capture user interface AR icons provided by the systems and methods of the present disclosure.
Figure 3B:
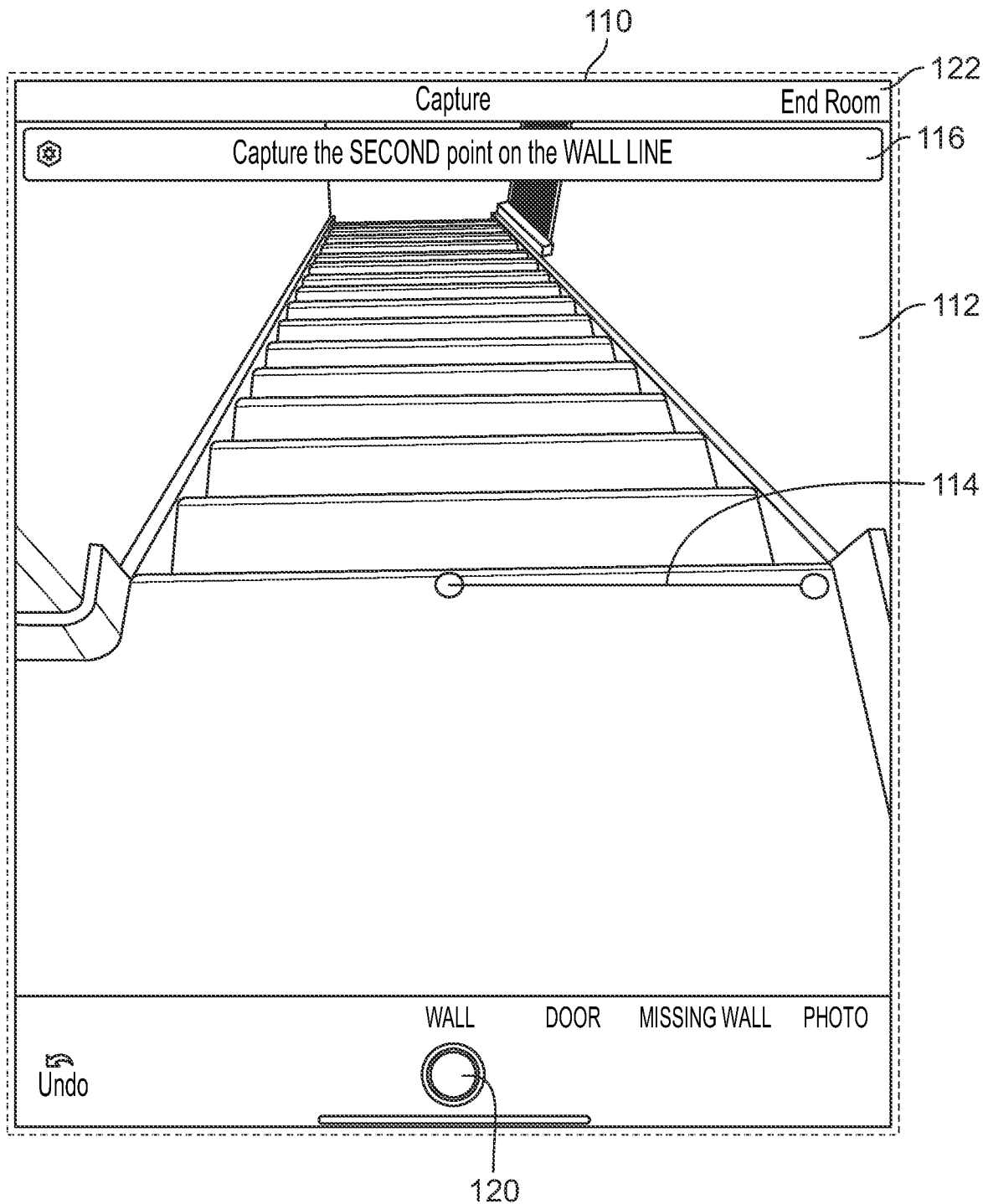

FIGS. 3A-3B are screenshots illustrating wall capture functions and associated wall capture user interface AR icons provided by the systems and methods of the present disclosure. As can be seen in FIG. 3A, when the device 12 is pointed to a wall of interest (to be modeled), a user interface screen 90 is displayed to the user, which includes an image frame 92 that includes a wall of interest (captured using the camera 40 of the device 12) and a wall AR icon 94 that can be manually or automatically positioned superimposed on the wall of interest. A prompt bar 96 requests that the user place the wall AR icon 94 on the wall of interest (in the event that the AR icon 94 is not automatically positioned on the wall of interest, or if the AR icon 94 requires repositioning in order to more accurately align with the wall of interest), and to actuate (e.g., tap) the capture button 98 when the AR icon 94 is accurately positioned on the wall of interest. Additionally, as can be seen in FIG. 3A, the user can switch to different AR icons for different types of objects (as will be described below) by sliding a slider bar positioned above the capture button 98 (e.g., the user can switch between a wall AR icon, a door AR icon, a missing wall AR icon, or engage a photo mode wherein photographs can be taken, if desired).

Alternatively and additionally, as illustrated in FIG. 3B, a different wall capture AR tool could be provided for capturing walls. As shown in the user interface screen 110, a line capture AR tool 112 is displayed superimposed on an image frame 112 and can positioned at a location in the image frame 112 where no wall currently exists, but the user wishes to create a model of a dividing wall at that location. Examples of where such functionality may be useful include "great rooms" that include kitchen, dining, and family areas that are open to each other, but the user desires to separately capture and model such areas. When the device 12 is pointed to a floor or a ceiling, the AR tool 112 is displayed as a dot. Using the AR tool 112, the user can create a line where rooms should be separated by capturing two dots anywhere along that line (whereupon the AR tool 112 illustrates the line as shown in FIG. 3B). A prompt bar 116 provides instructions to the user as to how to utilize the AR tool 112. When the wall has been captured, the user can actuate the capture button 120, which causes the wall to be added to the model being created. Additionally, when capturing of a room is complete, the user can tap the "end room" button 122, which causes a model of the room to be created based on the captured information delineated by the AR tool 112.

Figure 4:
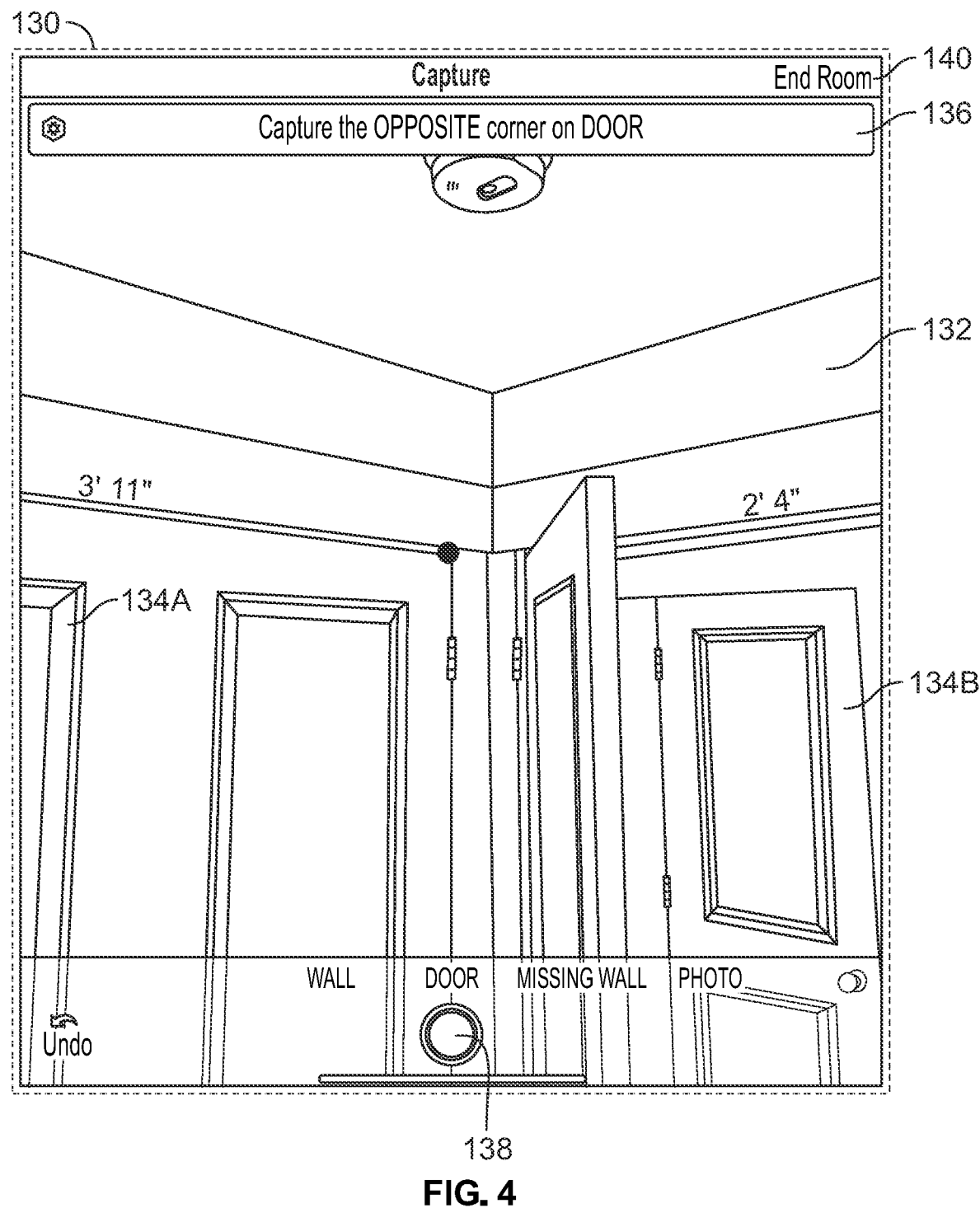
FIG. 4 is a screenshot illustrating door capture functions and associated door capture user interface AR icons provided by the systems and methods of the present disclosure.

FIG. 4 is a screenshot illustrating door capture functions and associated door capture user interface AR icons provided by the systems and methods of the present disclosure. As can be seen, the user interface screen 130 displays an image frame 132 that includes one or more doors to be modeled, as well as one or more door AR icons 134A-134B superimposed over the one or more doors. The AR icons 134A-134B allow the user to identify one or more doors to be modeled, and can be manipulated to define the doors. For example, each of the AR icons 134A-134B could initially be displayed in the center of the screen 130 as a dot which could be aligned with one corner of a door, whereupon the user selects the corner as a starting corner by pressing a selection button. The starting corner can be one of the corners on the top or bottom of the door, if desired. The device 12 could then be moved such that the dot is aligned with a corner opposite (diagonally) the starting corner. A rectangle is then displayed on the screen (superimposed on the door), indicating the area that will be captured as a door. The capture button 138 can be actuated when the door has been marked, and the door could then be captured for subsequent inclusion in a model. As with the user interface screens discussed herein, a prompt bar 136 could provide instructions to the user as to how to capture the door, and when the door has been captured, the user can actuate the "End Room" button 140 in order to end modeling of a room (e.g., when the door has been adequately captured). As can be seen in FIG. 4, various indicia indicating measurements of the door (or other feature) could be displayed next to the AR icon, if desired. Additionally, the AR icons 134A-134B could automatically "snap" (change shapes/sizes) to match a door height and/or width (e.g., to automatically delineate common door sizes). Further, the system could automatically identify the sizes and positions of doors, if desired.

Figure 5:
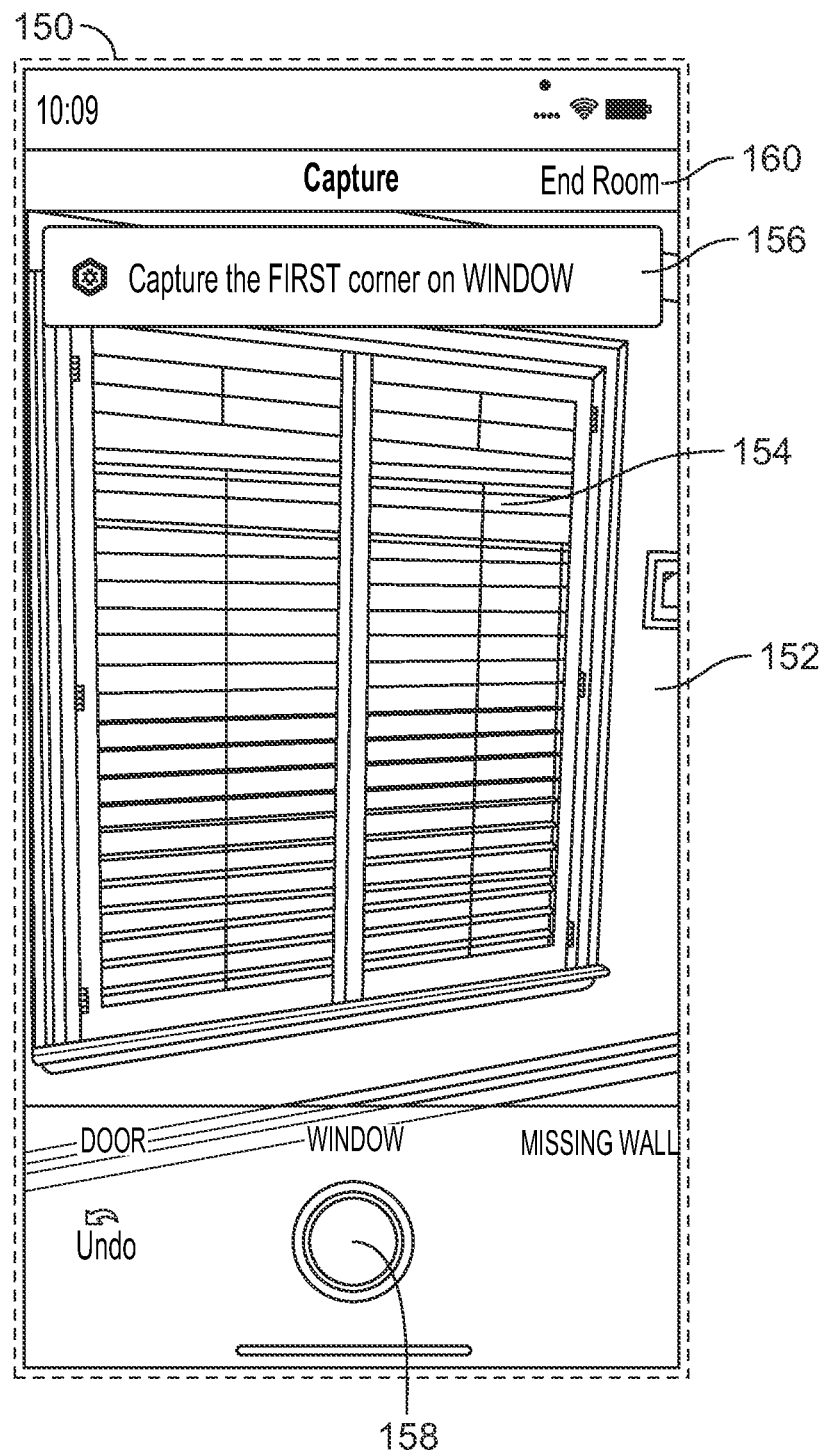
FIG. 5 is a screenshot illustrating window capture functions and associated window capture user interface AR icons provided by the systems and methods of the present disclosure.

FIG. 5 is a screenshot illustrating window capture functions and associated window capture user interface AR icons provided by the systems and methods of the present disclosure. Specifically, as shown in FIG. 5, the user interface screen 150 displays in image frame 152 that includes a window to be captured, and a window AR icon 154 displayed superimposed on the window. The window AR icon 154 can be manipulated by the user to match the shape of the window. For example, the user can mark two opposite corners of the window, which cause the window AR icon 154 to match the shape of the window to be captured. Further, the AR icon 154 could automatically identify the size and position of the window, if desired. When the AR icon 154 matches the shape of the window, the user can actuate the capture button 158 in order to capture the window and add it to a model. As with the other screens described herein, a prompt bar 156 is provided for instructing the user on how to manipulate the AR icon 154, and an "End Room" button 160 is provided and can be actuated when capturing of features of a room are complete, so that the features can be added to the model.

Figure 6:
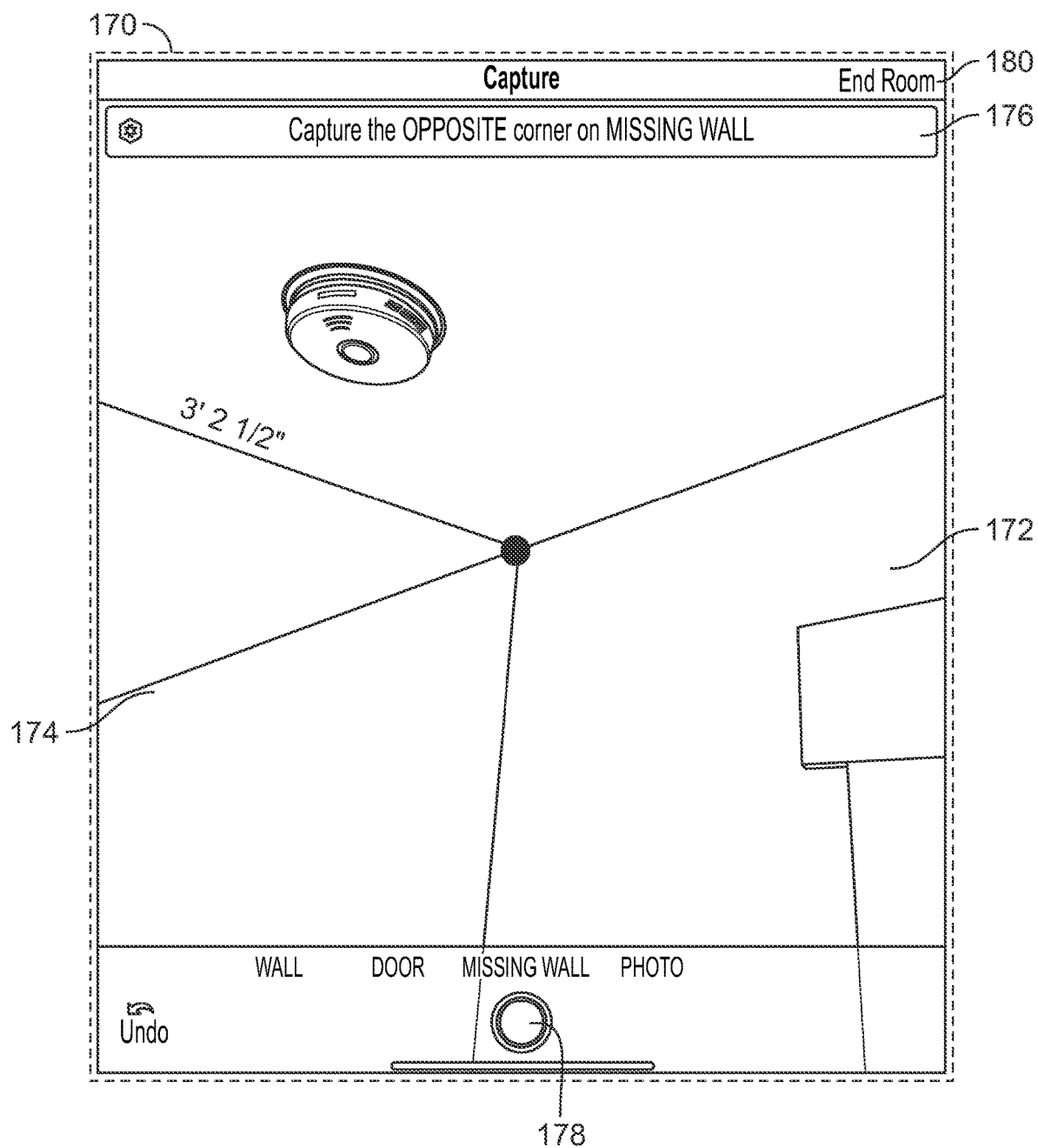
FIG. 6 is a screenshot illustrating missing wall capture functions and associated missing wall capture user interface AR icons provided by the systems and methods of the present disclosure.

FIG. 6 is a screenshot illustrating missing wall capture functions and associated missing wall capture user interface AR icons provided by the systems and methods of the present disclosure. As can be seen, the user interface screen 170 displays an image frame 172 and a missing wall AR tool 174 superimposed on the image frame 172. The missing wall AR tool 174 allows a user to define an opening in a wall for a model of a structure that is not a door or a window. This can be accomplished by using the AR tool 174 to define two opposite corner points (in the same manner as the door and window AR tools discussed above), whereupon the AR tool 174 defines a rectangular opening, or missing wall, that can be added to a model. A prompt bar 176 guides the user as to how to utilize the AR tool 174. When the missing wall has been defined using the AR tool 174, the user can actuate the capture button 178, whereupon the missing wall is added to a model. As with the other screens described herein, a prompt bar 176 is provided for instructing the user on how to manipulate the AR tool 174, and an "End Room" button

180 is provided and can be actuated when capturing of features of a room are complete, so that the features can be added to the model.

Figure 7A:
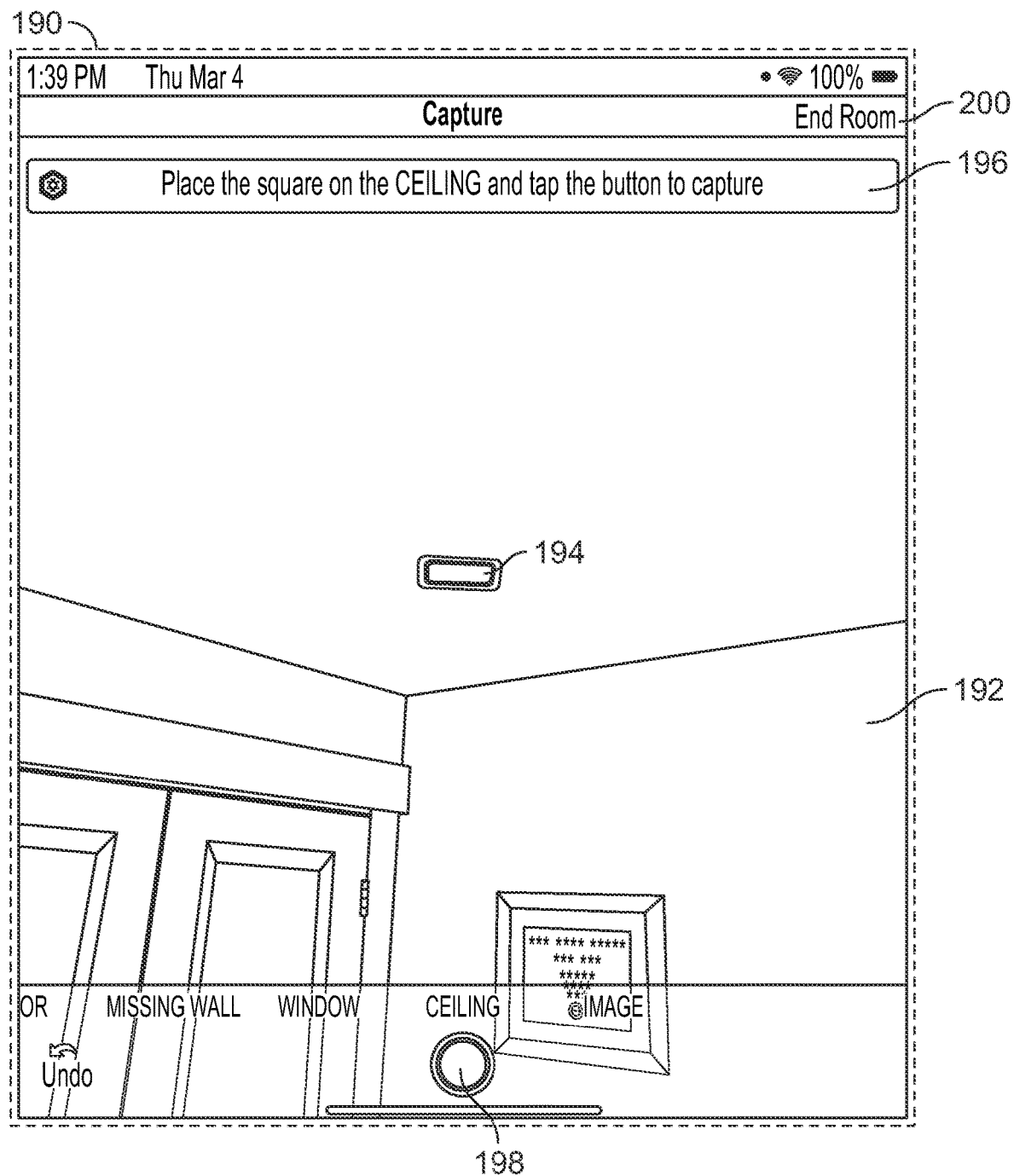
FIGS. 7A-7C are screenshots illustrating ceiling and floor capture functions and associated ceiling and wall capture user interface AR icons provided by the systems and methods of the present disclosure.
Figure 7B:
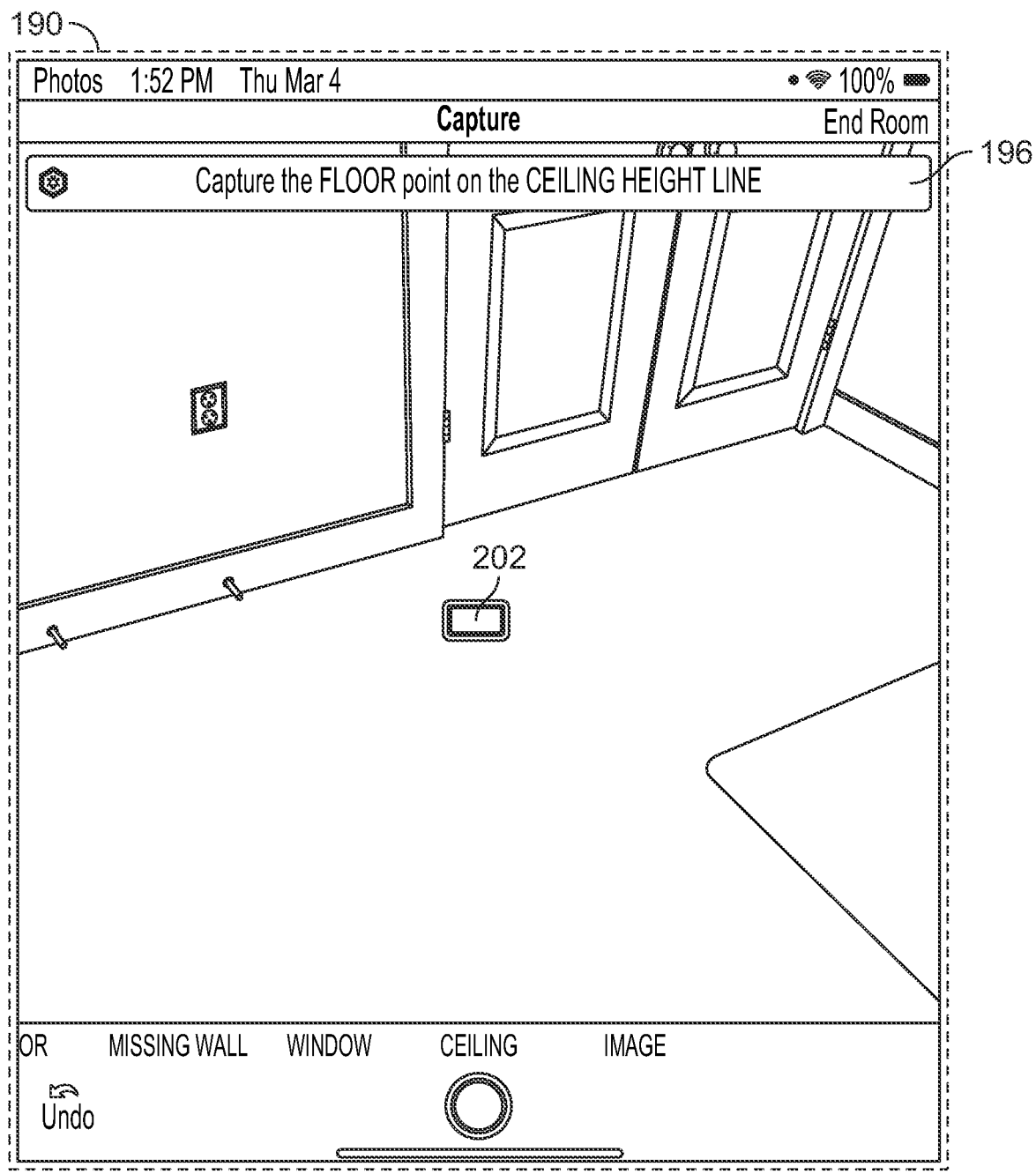
Figure 7C:
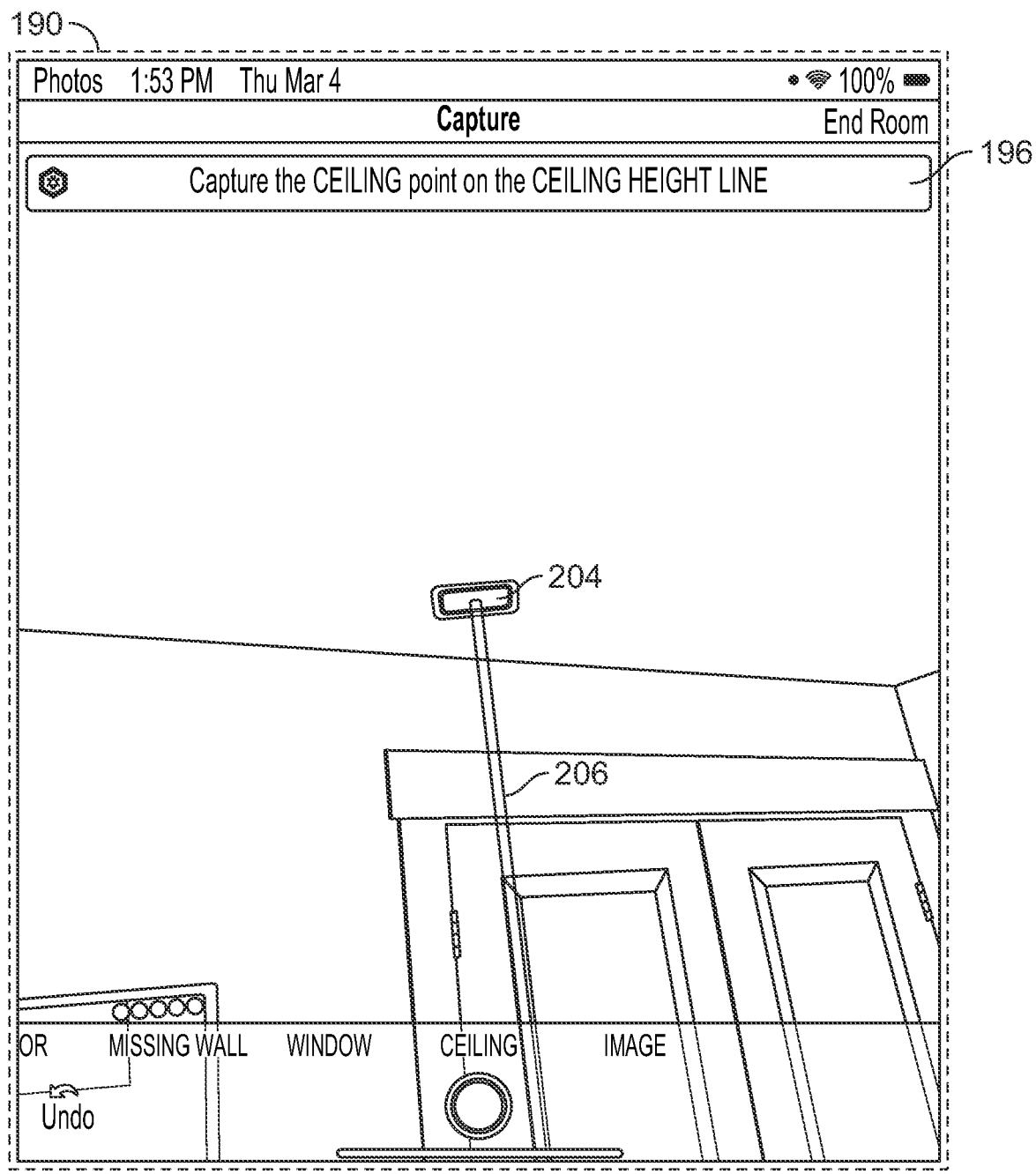

FIGS. 7A-7C are screenshots illustrating ceiling and floor capture functions and associated ceiling and wall capture user interface AR icons provided by the systems and methods of the present disclosure. As shown in FIG. 7A, the user interface screen 190 displays an image frame 192 that includes an image of a ceiling to be modeled, and a ceiling AR tool 194 superimposed on the image frame 192. The AR tool 194 can be re-positioned by the user as desired, to more accurately align with a ceiling to be modeled. A prompt bar 196 provides instructions as to how to utilize the AR tool 194. When the AR tool 194 correctly aligns with the ceiling shown in the image frame 192, the user can actuate the capture button 198, whereupon the ceiling is added to a model. The "End Room" button 200 can be actuated once all desired features have been captured, to generate a model of a room.

Alternatively and additionally, ceilings can be modeled using a different AR tool shown in FIGS. 7B-7C. As shown in FIG. 7B, the user interface screen 190 displays a floor AR tool 202 superimposed on the floor of a room shown in an image frame, when the device 12 is pointed at the floor of a room. The AR tool 202 can be aligned as desired, and once aligned, the user can actuate a selection button to mark a point on the floor. Then, as shown in FIG. 7C, the user can point the device 12 to the ceiling of the same room, whereupon a ceiling AR tool 204 appears in the display superimposed on the ceiling shown in the image frame. Additionally, a vertical AR tool 206 is displayed, interconnecting the ceiling AR tool 204 with the floor AR tool 202. When the ceiling AR tool 204 is properly positioned, the user can actuate a selection button, which causes the device 12 to calculate a ceiling height based on the positions of the floor AR tool 202 and the ceiling AR tool 204.

FIGS. 8A-8I are screenshots illustrating exterior feature capture functions and associated exterior feature capture user interface AR icons provided by the systems and methods of the present disclosure. It is noted that all of the AR tools and associated functions discussed above with capturing of interior features could also be used to capture exterior building features. As shown in FIG. 4A, a user interface screen 210 displays an image frame 212 including an image of one or more exterior features to be modeled, and one or more AR icons 214 displayed superimposed on the image 212. The one or more AR icons 214 could correspond to any of the AR icons discussed above, as well as additional icons discussed hereinbelow. When desired exterior features have been captured, the user can actuate a capture button 218 which causes the features to be added to a model. A prompt bar 216 provides the user with instructions on how to operate the one or more AR icons 214, and the user can actuate the "End Room" button when all desired exterior features have been captured, in order to generate a model of the exterior of the building. The tools described in FIGS. 8A-8I can be used to capture exterior walls, doors, windows, building footprints, exterior wall heights, and other features.

Figure 8A:
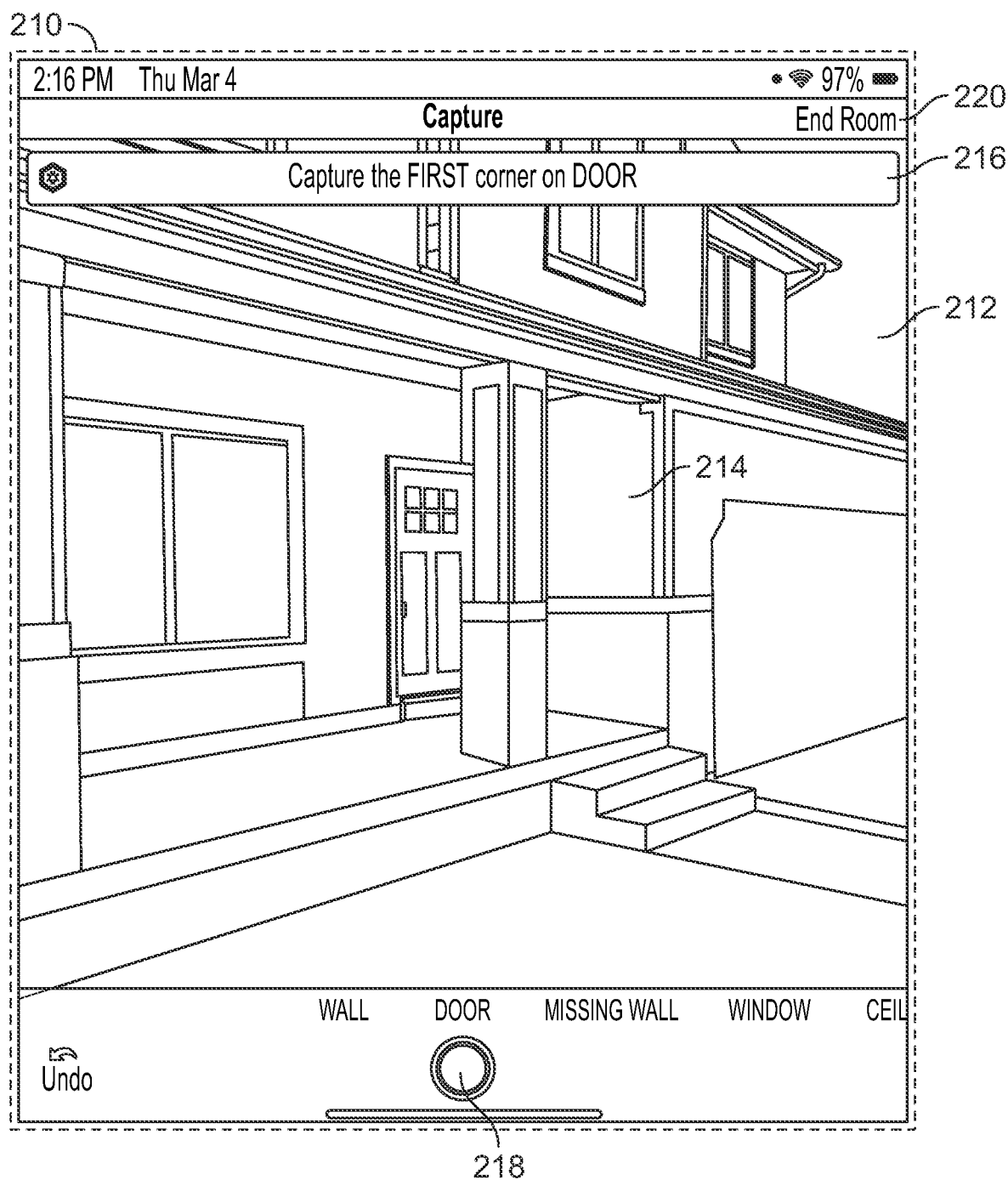
FIGS. 8A-8I are screenshots illustrating exterior feature capture functions and associated exterior feature capture user interface AR icons provided by the systems and methods of the present disclosure.
Figure 8B:
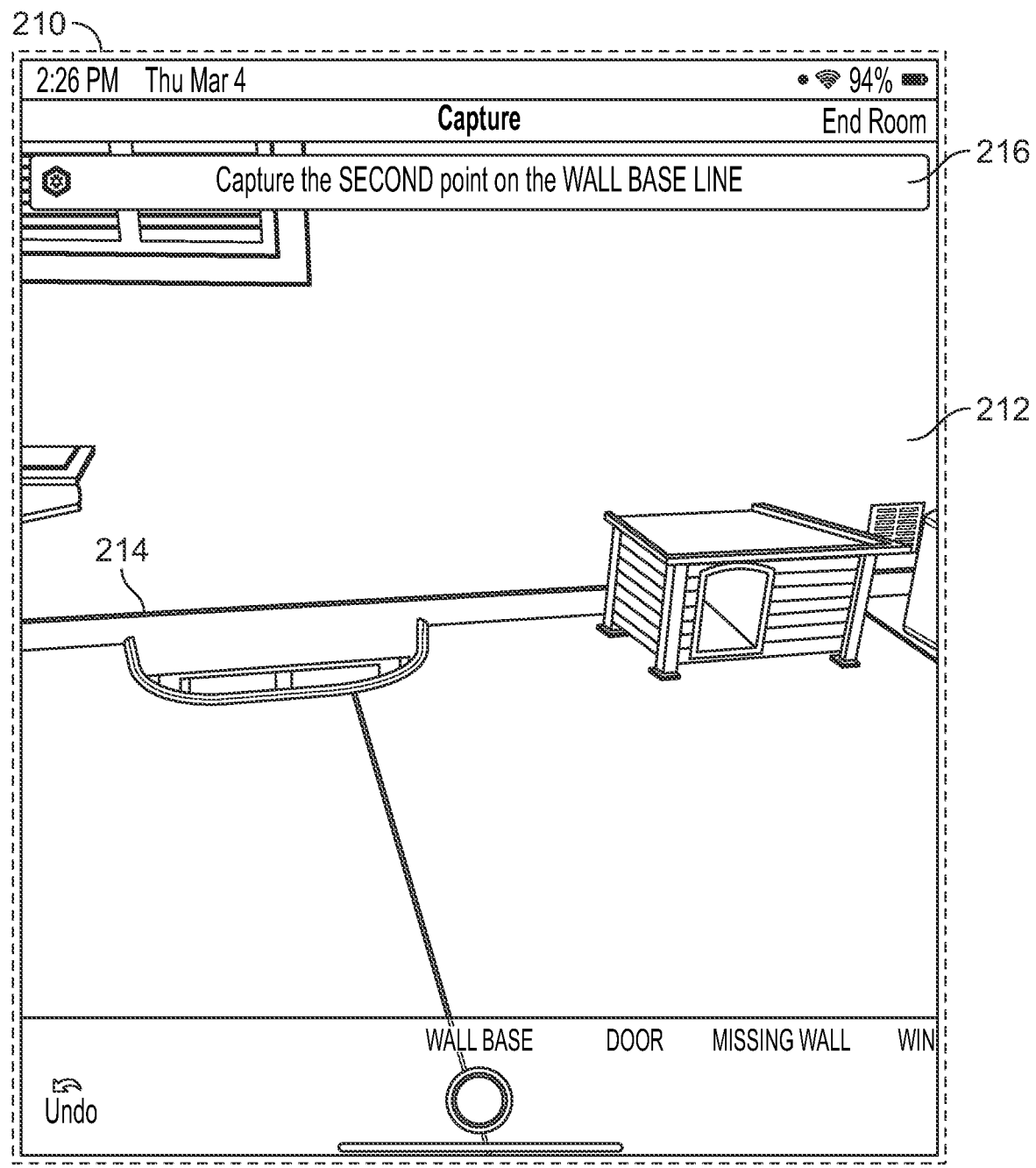

As shown in FIG. 8B, the AR icon 214 could allow a user to define points along a wall base of the exterior of a building, and could function in a manner similar to the wall AR tool 114 discussed above in connection with FIG. 3B. The tool 114 could be aligned with the base of an exterior wall and used to mark the base (typically, at the top of the foundation of the structure). Other features, such as the ground, could also be marked using the tool 214. A default base elevation could be defined using the tool 214, as well as a bottom horizontal line for capturing exterior walls (described below). Advantageously, the tool 214 allows the user to capture walls on a stepped foundation, as well as standard walls.

Figure 8C:
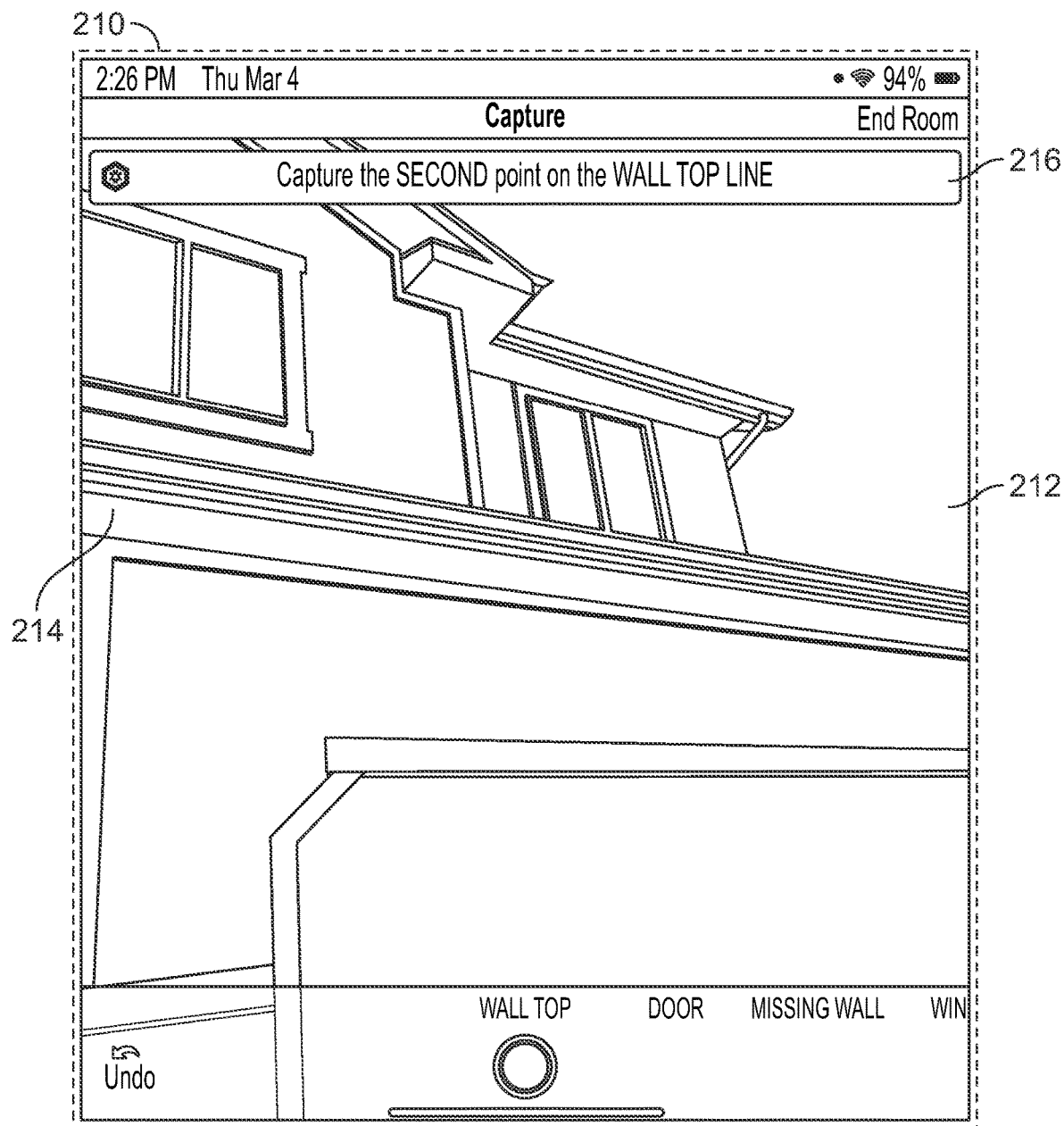

As shown in FIG. 8C, the tool 214 could also allow for marking and capturing of wall top lines, for indicating the tops of exterior walls. As the tool 214 is moved from point to point along the top of a wall, a line is indicated to the user. The user aligns the line with the top line of the wall and marks a second point. The ends points of the line do not need to be positioned at the ends of the wall, and could be positioned at any point along the wall top. The corresponding wall is then adjusted to match the captured line. This allows the user to capture gable end walls (triangular in shape) was well as standard walls (rectangular in shape).

Figure 8D:
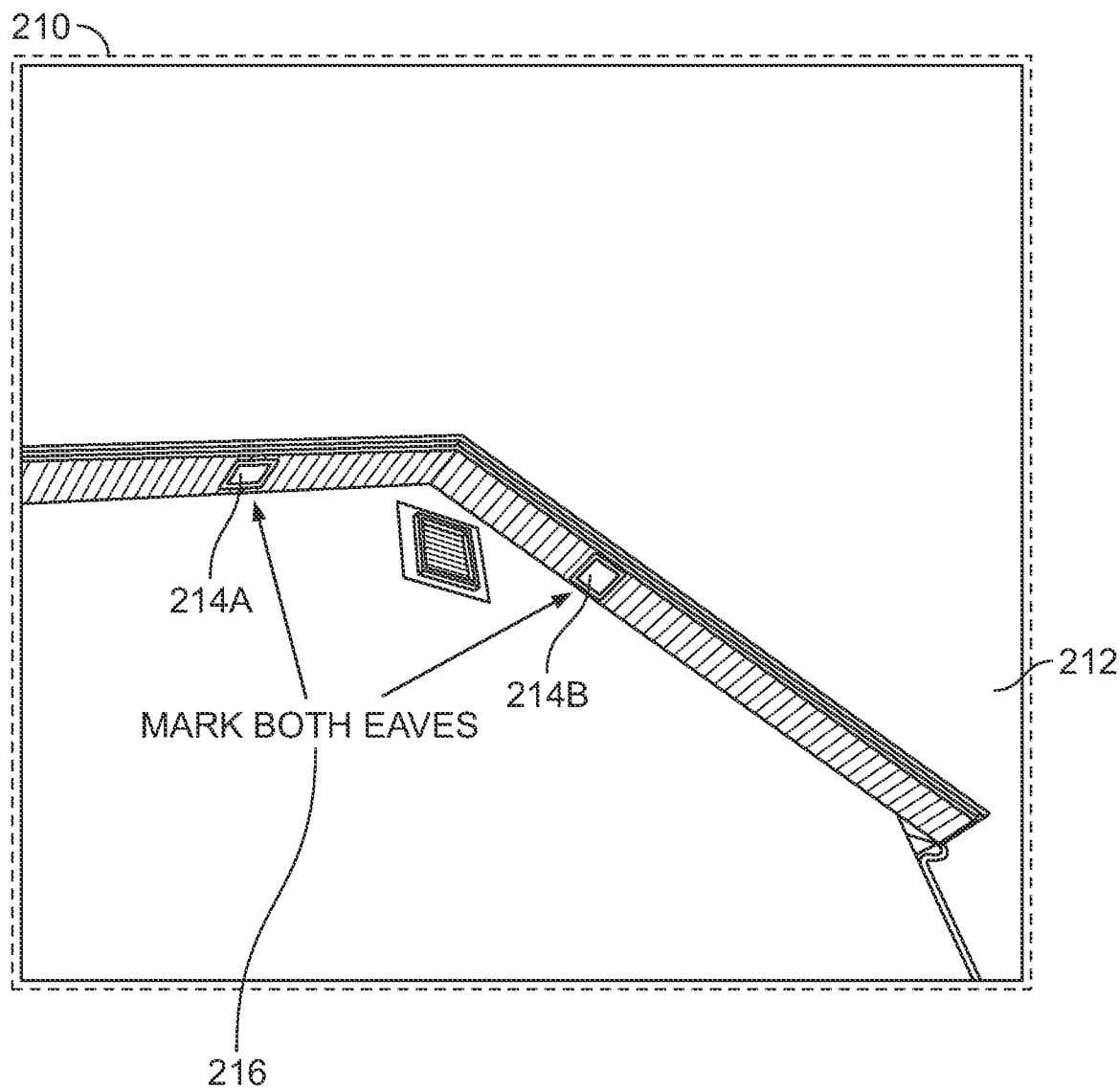
Figure 8E:
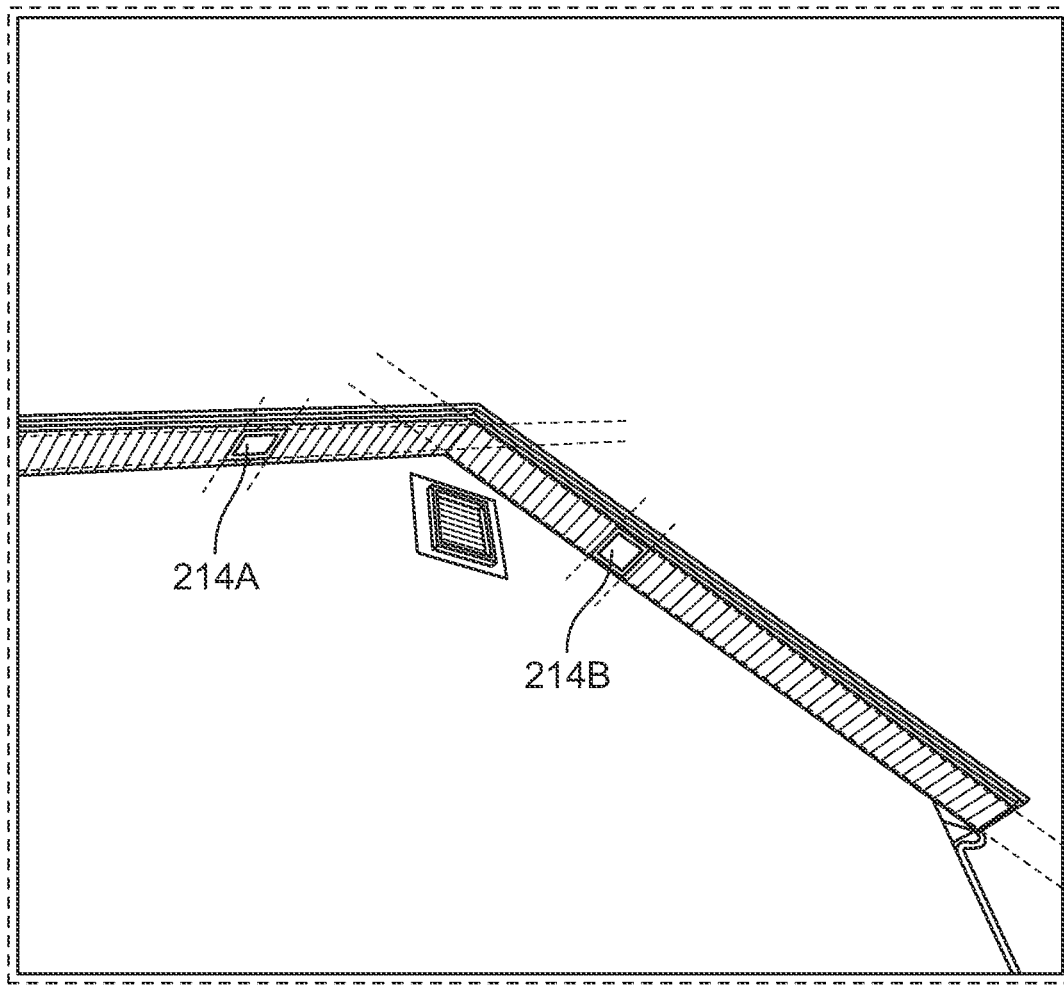

As shown in FIG. 8D, the tool 214 could be utilized to mark the tops of walls near roof features. To do so, the tool 214 could be split into two or more soffit AR tools 214A-214B, which could be positioned so that they are superimposed over the eaves of the roof. A prompt 216 could prompt the user to mark the eaves by positioning the AR tools 214A-214B on the eaves, and then actuating a selection button. As shown in FIG. 8E, once the eaves have been marked, the tools 214A-214B could project marker lines to assist with lining the tools 214A-214B with the tops of the walls in the image frame. Once aligned, the user can actuate a capture button to mark the wall tops.

Figure 8F:
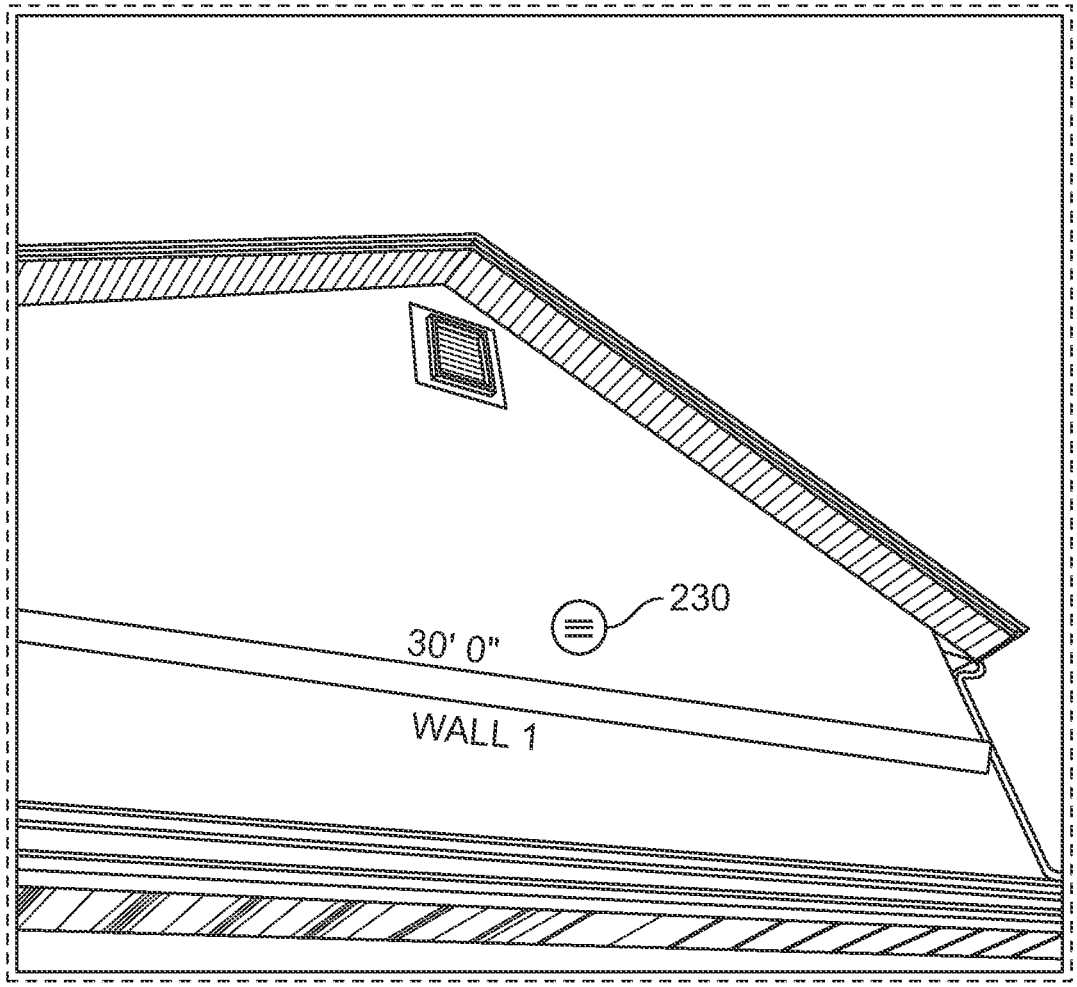

It is noted that information about walls captured by the system could be utilized to automatically construct roof features. Such a feature is helpful in circumstances where the three-dimensional sensor 40 is not capable of detecting three-dimensional data corresponding to roof features (e.g., the sensor is not sensitive enough, or the roof features are not within range of the sensors). As shown in FIG. 8F, a selection indicator 230 is displayed on the screen, and the user can be prompted to identify the type of wall that appears in the screen, such as a gable wall (triangle shape) or an eve wall (rectangle shape). Once the wall type is identified, the system can automatically create the roof structure above the walls based on the identified wall types. For example, a roof plane could be constructed by the system at the top of each identified eave wall, and could be offset from the wall to allow for overhangs. The slope could be calculated from adjacent gable walls that have been identified. If the adjacent walls are not gable walls, a default slope could be utilized or the user could specify a slope value.

Figure 8G:
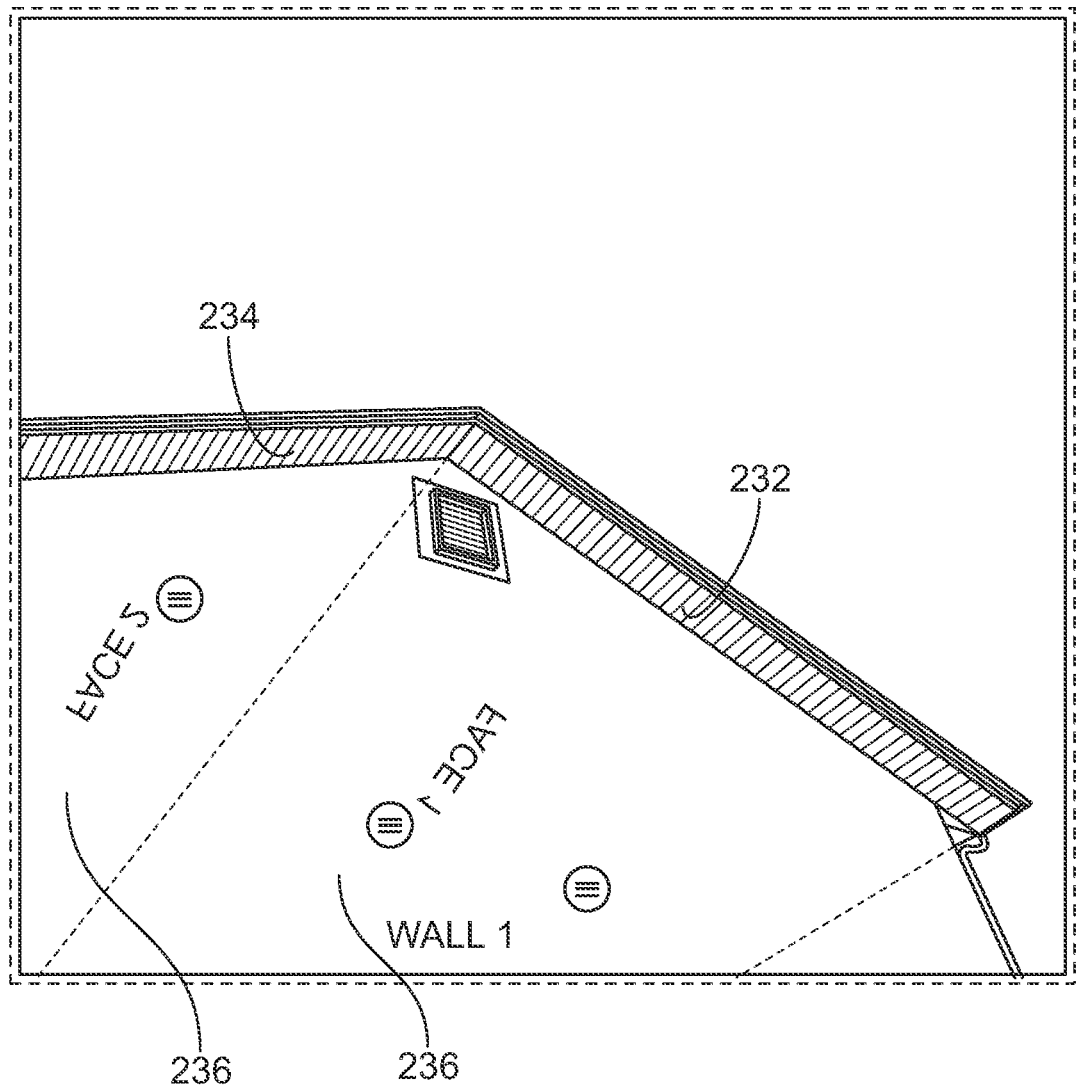

As shown in FIG. 8G, each of the roof planes (indicated at 232 and 234) could be intersected with one another to form closed polyhedrons 236 in combination with the walls. The "straight skeleton" methods described in U.S. Pat. No. 10,127,670 to Lewis, et al., the entire disclosure of which is expressly incorporated herein by reference, could be utilized to form the polyhedrons 236, as well as constructive solid geometry (CSG) methods.

Figure 8H:
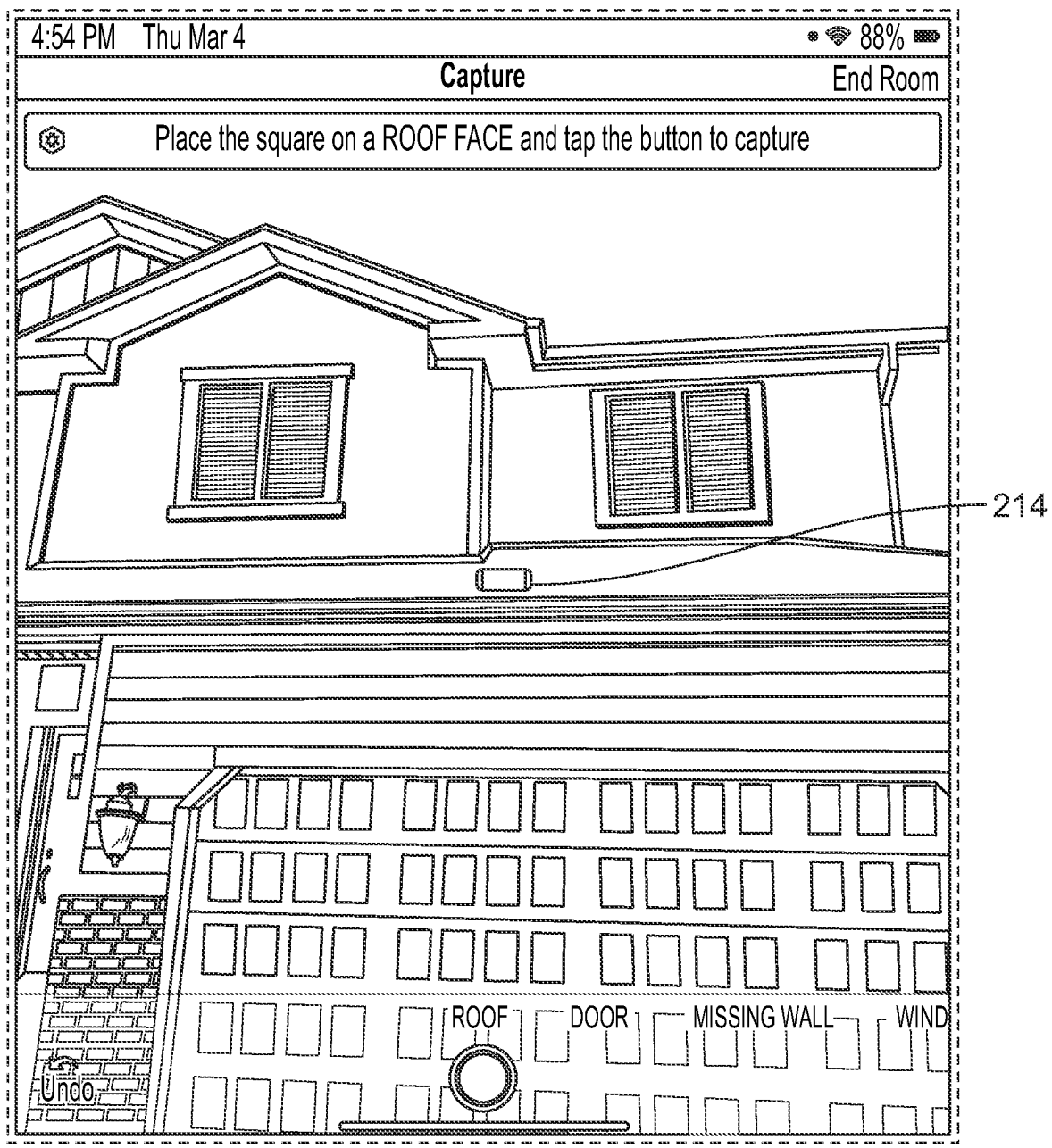
Figure 8I:
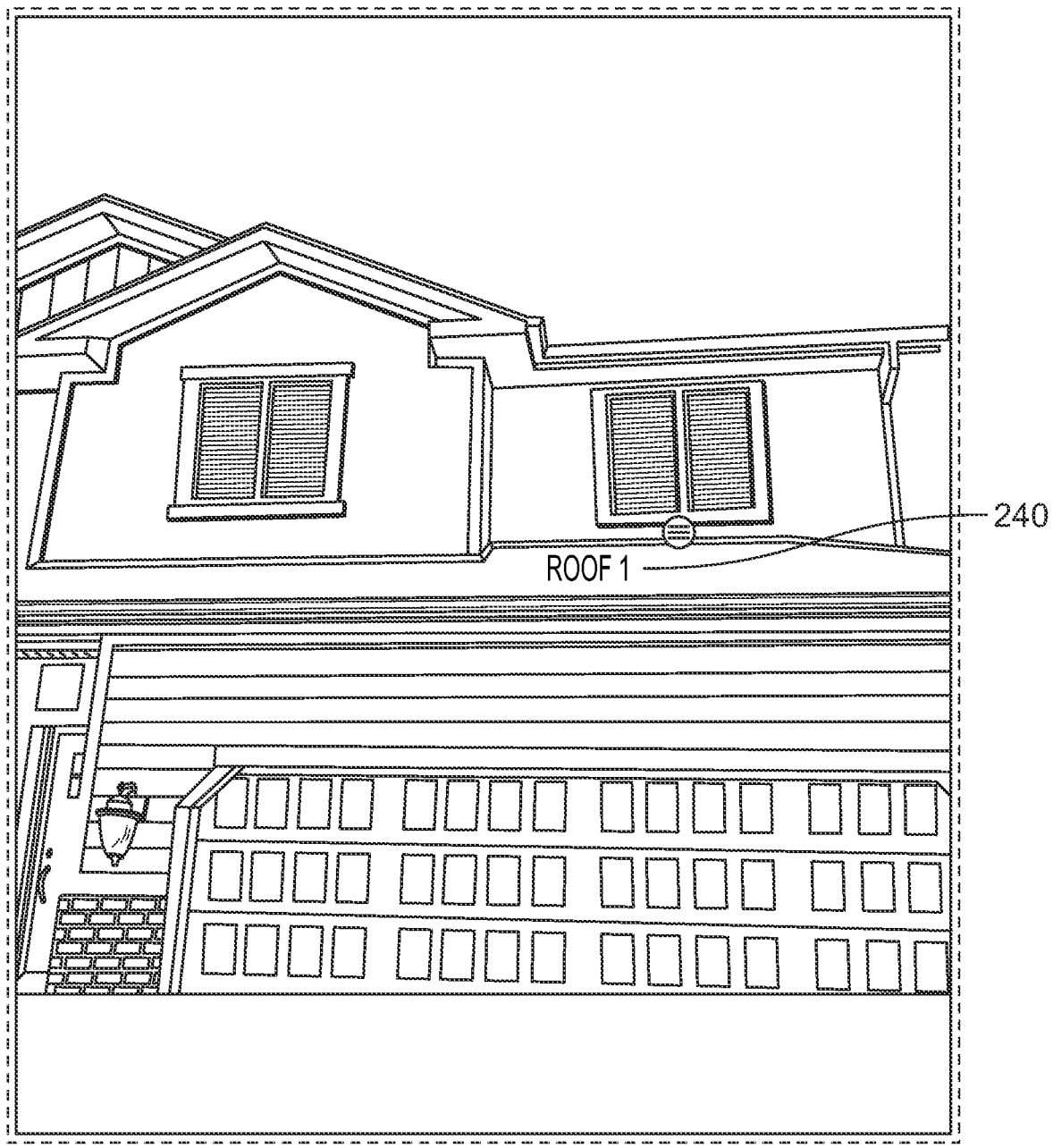

As shown in FIG. 8H, the tool 214 could also allow a user to define one or more roof features of a building by selecting roof faces and to make slope adjustments as needed. The slope could be set manually (the user manually measures and enters the slope), or by placing the tool 214 on the desired roof surface and actuating capture button (similar to capturing walls or ceilings as discussed above). As shown in FIG. 8I, the roof surface could be delineated by a marker 240 superimposed over the roof surface.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A computer vision system for generating a model of a building, comprising:
   a mobile device including a three-dimensional sensor, a camera, and a processor; and
   a memory in communication with the processor and storing modeling code, the processor executing the modeling code to perform the steps of:
      acquiring an image frame from the camera, the image frame depicting at least part of a building to be modeled;
      acquiring three-dimensional data from the three-dimensional sensor;
      processing the image frame and the three-dimensional data to detect a building object in the building frame;
      displaying an augmented reality (AR) icon on a display of the mobile device superimposed on the image frame;
      allowing a user to capture the building object using the AR icon; and
      generating a complete model of the building including the building object.

2. The system of claim 1, wherein the processor further performs the steps of allowing the user to adjust the AR icon and re-displaying the AR icon after adjustment.

3. The system of claim 1, wherein the building object is a wall and the AR icon is a wall AR icon displayed superimposed on the wall.

4. The system of claim 1, wherein the building object is a door and the AR icon is a door AR icon displayed superimposed on the door.

5. The system of claim 1, wherein the building object is a window and the AR icon is a window AR icon displayed superimposed on the window.

6. The system of claim 1, wherein the AR icon is a missing wall AR icon.

7. The system of claim 6, wherein the missing wall AR icon is positionable in a desired location in the image frame to define a wall.

8. The system of claim 1, wherein the building object is a ceiling and the AR icon is a ceiling AR icon displayed superimposed on the ceiling.

9. The system of claim 8, wherein the ceiling AR icon is adjustable to measure a ceiling height.

10. The system of claim 1, wherein the building object is a floor and the AR icon is a floor AR icon displayed superimposed on the floor.

11. The system of claim 1, wherein the building object is an eave and the AR icon is an eave AR icon displayed superimposed on the eave.

12. The system of claim 1, wherein the building object is a roof face and the AR icon is a roof face icon displayed superimposed on the roof face.

13. A computer vision method for generating a model of a building, comprising the steps of:
   acquiring an image frame from a camera of a mobile device, the image frame depicting at least part of a building to be modeled;
   acquiring three-dimensional data from a three-dimensional sensor of the mobile device;
   processing the image frame and the three-dimensional data to detect a building object in the building frame;
   displaying an augmented reality (AR) icon on a display of the mobile device superimposed on the image frame;
   allowing a user to capture the building object using the AR icon; and
   generating a complete model of the building including the building object.

14. The method of claim 13, wherein the processor further performs the steps of allowing the user to adjust the AR icon and re-displaying the AR icon after adjustment.

15. The method of claim 13, wherein the building object is a wall and the AR icon is a wall AR icon displayed superimposed on the wall.

16. The method of claim 13, wherein the building object is a door and the AR icon is a door AR icon displayed superimposed on the door.

17. The method of claim 13, wherein the building object is a window and the AR icon is a window AR icon displayed superimposed on the window.

18. The method of claim 13, wherein the AR icon is a missing wall AR icon.

19. The method of claim 18, wherein the missing wall AR icon is positionable in a desired location in the image frame to define a wall.

20. The method of claim 13, wherein the building object is a ceiling and the AR icon is a ceiling AR icon displayed superimposed on the ceiling.

21. The method of claim 20, wherein the ceiling AR icon is adjustable to measure a ceiling height.

22. The method of claim 13, wherein the building object is a floor and the AR icon is a floor AR icon displayed superimposed on the floor.

23. The method of claim 13, wherein the building object is an eave and the AR icon is an eave AR icon displayed superimposed on the eave.

24. The method of claim 13, wherein the building object is a roof face and the AR icon is a roof face icon displayed superimposed on the roof face.

* * * * *